US 11,904,809 B2

(12) United States Patent
Tsuchiya

(10) Patent No.: US 11,904,809 B2
(45) Date of Patent: Feb. 20, 2024

(54) VEHICLE CONTROL DEVICE

(71) Applicant: TOYOTA JIDOSHA KABUSHIKI KAISHA, Toyota (JP)

(72) Inventor: Yoshiyuki Tsuchiya, Hamamatsu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 573 days.

(21) Appl. No.: 17/136,829

(22) Filed: Dec. 29, 2020

(65) Prior Publication Data

US 2021/0237687 A1   Aug. 5, 2021

(30) Foreign Application Priority Data

Feb. 4, 2020   (JP) .................................. 2020-016958

(51) Int. Cl.
*B60R 25/24*  (2013.01)
*B60L 53/30*  (2019.01)
*B60L 53/16*  (2019.01)

(52) U.S. Cl.
CPC .......... *B60R 25/243* (2013.01); *B60L 53/305* (2019.02); *B60L 53/16* (2019.02)

(58) Field of Classification Search
CPC ...... B60L 53/16; B60L 53/305; B60R 25/241; B60R 25/243; H04L 63/0861; H04W 12/06; H04W 12/084; H04W 12/77; H04W 4/48; Y02T 10/70; Y02T 10/7072; Y02T 90/12; Y02T 90/14; Y02T 90/16
See application file for complete search history.

(56) References Cited

U.S. PATENT DOCUMENTS

| | | | |
|---|---|---|---|
| 7,950,943 B2 * | 5/2011 | Ohtomo .................. | B60L 53/16 439/299 |
| 8,708,728 B2 * | 4/2014 | Hirashita ................ | B60L 53/16 439/304 |
| 8,951,060 B2 * | 2/2015 | Meyer-Ebeling ....... | B60L 53/16 320/109 |
| 9,533,586 B2 * | 1/2017 | Kahara .................... | B60L 53/16 |
| 9,592,736 B2 * | 3/2017 | Broecker ................ | B60L 53/16 |
| 2009/0082916 A1 | 3/2009 | Tanaka | |
| 2009/0286414 A1 | 11/2009 | Ohtomo | |

FOREIGN PATENT DOCUMENTS

| | | |
|---|---|---|
| JP | 2009-081917 A | 4/2009 |
| JP | 2010-004731 A | 1/2010 |
| JP | 2019-170025 A | 10/2019 |

* cited by examiner

*Primary Examiner* — Tyler J Lee
(74) *Attorney, Agent, or Firm* — Sughrue Mion, PLLC

(57) ABSTRACT

A vehicle control device controls a vehicle including an occupant door and an opening and closing member for a shareable space. The vehicle control device is configured to control switching between a locked state and an unlocked state of an inlet, and to execute first control. In the first control, the inlet is switched to the unlocked state when the opening and closing member for the shareable space is unlocked by a user while the inlet is in the locked state. The inlet is not switched to the unlocked state when the opening and closing member for the shareable space is unlocked by a third person while the inlet is in the locked state.

12 Claims, 16 Drawing Sheets

VEHICLE CONTROL DEVICE

CROSS-REFERENCE TO RELATED APPLICATION

This application claims priority to Japanese Patent Application No. 2020-016958 filed on Feb. 4, 2020, incorporated herein by reference in its entirety.

BACKGROUND

1. Technical Field

The present disclosure relates to a vehicle control device, and more particularly, to a vehicle control device configured to control a vehicle having a shareable space accessible to a third person other than a user of the vehicle.

2. Description of Related Art

Japanese Unexamined Patent Application Publication No. 2010-4731 (JP 2010-4731 A) discloses a control device configured to control switching between a locked state and an unlocked state of an inlet to which a connector of an outlet cable is connected. This control device switches the inlet to the unlocked state when doors provided on a vehicle body are unlocked. The control device switches the inlet to the locked state when the doors provided on the vehicle body are locked.

SUMMARY

In the vehicle described in JP 2010-4731 A, when the connector of the outlet cable connected to power supply equipment outside the vehicle is connected to the inlet, a power storage device mounted on the vehicle can externally be charged (that is, the power storage device of the vehicle is charged with electric power supplied to the inlet from the power supply equipment outside the vehicle). For example, the user starts the external charging after the connector of the outlet cable connected to the power supply equipment is connected to the inlet of the vehicle and the inlet is locked by locking the doors provided on the vehicle body. The user temporarily leaves the vehicle during the external charging, and returns to the vehicle around a timing of completion of the external charging. When the user unlocks the doors of the vehicle, the control device described in JP 2010-4731 A switches the inlet to the unlocked state. Therefore, the user need not unlock the inlet at the completion of the external charging. Thus, user's troublesome work is reduced at the completion of the external charging.

As described above, the user's troublesome work is reduced at the completion of the external charging by unlocking the inlet in conjunction with unlocking of the doors provided on the vehicle body.

There is known a vehicle having a shareable space accessible to a third person other than a user of the vehicle. For example, it has been proposed in recent years that the vehicle be used as a delivery box. The shareable space that can be used as the delivery box is hereinafter referred to also as "delivery space". The following problems may arise when the inlet is unlocked in conjunction with unlocking of a door that opens or closes the delivery space (hereinafter referred to also as "delivery door").

The delivery door may be unlocked by a delivery person as well as the user. When the delivery door is unlocked by the delivery person and the inlet is unlocked in conjunction with the unlocking of the delivery door, someone may detach the connector of the outlet cable from the inlet while the user is away from the vehicle. If the outlet cable is detachable from the power supply equipment, someone may steal the outlet cable.

Depending on standards for charging, external charging may be limited when the inlet is unlocked. For example, in the standard Type 2 (IEC 62196-2) adopted mainly in Europe, external charging is stopped when the inlet is unlocked. The external charging cannot be performed until the inlet is locked. In the standard GB/T adopted mainly in China, a current of the external charging is limited to 16 A or smaller when the inlet is unlocked. The external charging is limited when the delivery door is unlocked by a delivery person and the inlet is unlocked while the user is away from the vehicle. In this case, there is a possibility that the power storage device of the vehicle is not sufficiently charged when the user returns to the vehicle.

JP 2010-4731 A describes nothing about the problems described above.

The present disclosure has been made to solve the problems described above, and has an object to appropriately control switching between a locked state and an unlocked state of an inlet in a vehicle having a shareable space accessible to a third person other than a user of the vehicle.

A first aspect of the disclosure relates to a vehicle control device configured to control a vehicle having a shareable space accessible to a third person other than a user of the vehicle, the vehicle including: an occupant door; an opening and closing member configured to open and close the shareable space; an inlet connectable to a connector of an outlet cable; and a power storage device chargeable with electric power supplied to the inlet from an outside of the vehicle, the occupant door and the opening and closing member being lockable and unlockable by the user, the opening and closing member being unlockable by a predetermined third person, the inlet being switchable between a locked state in which detachment of the connector is restricted and an unlocked state in which the detachment of the connector is permitted, the vehicle control device comprising an electronic control unit, the electronic control unit being configured to: control switching between the locked state and the unlocked state of the inlet; switch the inlet to the unlocked state when the opening and closing member is unlocked by the user while the inlet is in the locked state; and restrain switching the inlet to the unlocked state when the opening and closing member is unlocked by the third person while the inlet is in the locked state.

The opening and closing member configured to open and close the shareable space (for example, a delivery space) is unlockable by the predetermined third person (for example, a delivery person). The user can exchange goods with the third person using the shareable space to be opened and closed by the opening and closing member. The third person may be permitted to unlock the opening and closing member only in a predetermined time frame.

Since the control device executes the control described above, the following effects are attained. In the control described above, the control device does not switch the inlet to the unlocked state when the opening and closing member for the shareable space is unlocked by the third person. Thus, it is easier to suppress inconvenience (for example, theft of the outlet cable and limitation on external charging) that may be caused when the inlet is unlocked while the user is absent. In the control described above, the control device switches the inlet to the unlocked state when the opening and closing member for the shareable space is unlocked by the user.

Therefore, the user need not unlock the inlet at the completion of the external charging. Thus, the user's troublesome work is reduced at the completion of the external charging.

In the above aspect, the shareable space may be an enclosed luggage space that is not connected to an occupant space; and the opening and closing member may be a trunk or a hatch.

According to the aspect described above, the shareable space is not connected to the occupant space (cabin). Therefore, nobody can enter the occupant space through the shareable space. That is, the predetermined third person can access the shareable space, but cannot access the occupant space. Thus, theft of accessories in the occupant space can be suppressed.

The trunk or the hatch is used also in existing vehicles as the enclosed luggage space, and can be used as the opening and closing member configured to open and close the shareable space that is not connected to the occupant space.

In the above aspect, the electronic control unit may be configured such that, when the opening and closing member is unlocked by the third person while the power storage device is being charged with the electric power supplied to the inlet from the outside of the vehicle, the electronic control unit reports, to the third person, that the power storage device is being charged.

When the third person (for example, a delivery person) unlocks the opening and closing member for the shareable space during the external charging, a report that the charging is being performed is given to the third person. Thus, it is possible to increase safety when the vehicle is used as the shareable space during the external charging.

In the above aspect, the electronic control unit may be configured such that, when the opening and closing member is unlocked by the third person, the electronic control unit notifies the user that the opening and closing member is unlocked by the third person.

According to the aspect described above, the user is notified when the third person (for example, a delivery person) unlocks the opening and closing member for the shareable space. For example, the user waiting for delivery can be informed through the notification that the delivery is completed.

In the above aspect, the electronic control unit may be configured to select a control mode from among options including a first control mode; the electronic control unit may be configured to switch the inlet to the unlocked state when the first control mode is selected and when the opening and closing member is unlocked by the user while the inlet is in the locked state; and the electronic control unit may be configured to restrain switching the inlet to the unlocked state when the first control mode is selected and when the opening and closing member is unlocked by the third person while the inlet is in the locked state.

According to the aspect described above, the control mode can be selected depending on situations. For example, in the first control mode, the control device does not switch the inlet to the unlocked state when the opening and closing member for the shareable space is unlocked by the third person. Thus, it is easier to suppress the inconvenience that may be caused when the inlet is unlocked while the user is absent. In the first control mode, the control device switches the inlet to the unlocked state when the opening and closing member for the shareable space is unlocked by the user. Therefore, the user need not unlock the inlet at the completion of the external charging. Thus, the user's troublesome work is reduced at the completion of the external charging.

In the above aspect, the electronic control unit may be configured to select a control mode from among the options further including a second control mode; the electronic control unit may be configured to switch the inlet to the unlocked state when the second control mode is selected and when the occupant door is unlocked while the inlet is in the locked state; and the electronic control unit may be configured to restrain switching the inlet to the unlocked state when the second control mode is selected and when the opening and closing member is unlocked while the inlet is in the locked state.

According to the aspect described above, not only the first control mode but also the second control mode can be selected. In the second control mode, the control device switches the inlet to the unlocked state when the occupant door is unlocked. Therefore, the user need not unlock the inlet at the completion of the external charging. Thus, the user's troublesome work is reduced at the completion of the external charging. The occupant door is unlocked by the user, but is not unlocked by a person other than the user. In the second control mode, the control device does not switch the inlet to the unlocked state when the opening and closing member for the shareable space is unlocked. That is, the inlet is not unlocked though the opening and closing member is unlocked by the user or the predetermined third person. Thus, it is easier to suppress the inconvenience that may be caused when the inlet is unlocked while the user is absent.

The control device may be configured to allow the user to select the first control mode or the second control mode. For example, the control device may select the first control mode or the second control mode in response to a user's input operation.

In the above aspect, the electronic control unit may be configured to select a control mode from among the options further including a third control mode; and the electronic control unit may be configured to restrain switching the inlet to the unlocked state when the third control mode is selected and when the occupant door or the opening and closing member is unlocked while the inlet is in the locked state.

According to the aspect described above, not only the first control mode but also the third control mode can be selected. In the third control mode, the control device does not switch the inlet to the unlocked state when the occupant door or the opening and closing member for the shareable space is unlocked. According to the third control mode, it is easier to suppress the occurrence of a case where the scheduled external charging is not performed appropriately.

In the above aspect, the electronic control unit may be configured to select the third control mode when charging based on a preset schedule or charging through a remote operation on the outside of the vehicle is being performed or when the charging based on the preset schedule or the charging through the remote operation on the outside of the vehicle is scheduled.

Charging based on a preset schedule is hereinafter referred to also as "timer charging". Charging through a remote operation on the outside of the vehicle is hereinafter referred to also as "remote charging". According to the aspect described above, the electronic control unit may be configured to select the third control mode when the timer charging is being performed or is scheduled. Also, the electronic control unit may be configured to select the third control mode when the remote charging is being performed or is scheduled.

The timer charging may be used when the charging is performed in a time frame in which the electricity rate is low. The remote charging may be used to obtain an incentive in response to a request of demand response (DR). When the timer charging and the remote charging are performed as scheduled, a great benefit (for example, financial benefit) may be attained. According to the aspect described above, the timer charging and the remote charging are easily performed as scheduled.

In the above aspect, the electronic control unit may be configured to select a control mode from among the options further including a fourth control mode; and the electronic control unit may be configured to switch the inlet to the unlocked state when the fourth control mode is selected and when the occupant door or the opening and closing member is unlocked while the inlet is in the locked state.

According to the aspect described above, not only the first control mode but also the fourth control mode can be selected. In the fourth control mode, the control device switches the inlet to the unlocked state when the occupant door or the opening and closing member for the shareable space is unlocked. The fourth control mode may be selected when the shareable space is not used by the third person (for example, the delivery space of the vehicle is not used as the delivery box). When the fourth control mode is selected, the user can unlock the inlet by unlocking the occupant door or the opening and closing member for the shareable space.

When the vehicle is not present at a position where the vehicle can be used as the delivery box (for example, a house or a workplace), the delivery space of the vehicle is not used as the delivery box. For example, when the vehicle is externally charged using public power supply equipment, there is a possibility that the delivery space is not used as the delivery box. In the above aspect, the electronic control unit may be configured to select the fourth control mode when the vehicle is not present at a predetermined position.

A time frame in which the vehicle is not used as the delivery box may be known in advance. In the above aspect, the electronic control unit may be configured to select the fourth control mode in a predetermined time frame.

In the above aspect, the electronic control unit may be configured to switch the inlet to the locked state when both the occupant door and the opening and closing member are in a locked state while the inlet is in the unlocked state.

According to the aspect described above, the inlet is locked when the user locks the occupant door and the opening and closing member for the shareable space. Therefore, the user need not lock the inlet at the start of the external charging. Thus, the user's troublesome work is reduced at the start of the external charging.

A second aspect of the disclosure relates to a vehicle control device configured to control a vehicle having a shareable space accessible to a third person other than a user of the vehicle, the vehicle including: an occupant door; an opening and closing member configured to open and close the shareable space; an inlet connectable to a connector of an outlet cable; and a power storage device chargeable with electric power supplied to the inlet from an outside of the vehicle, the occupant door and the opening and closing member being lockable and unlockable by the user, the opening and closing member being unlockable by a predetermined third person, the inlet being switchable between a locked state in which detachment of the connector is restricted and an unlocked state in which the detachment of the connector is permitted, the vehicle control device comprising an electronic control unit, the electronic control unit being configured to: control switching between the locked state and the unlocked state of the inlet; switch the inlet to the unlocked state when the occupant door is unlocked while the inlet is in the locked state; and restrain switching the inlet to the unlocked state when the opening and closing member is unlocked while the inlet is in the locked state.

Since the control device executes the control described above, the following effects are attained. In the control described above, the control device switches the inlet to the unlocked state when the occupant door is unlocked. Therefore, the user need not unlock the inlet at the completion of the external charging. Thus, the user's troublesome work is reduced at the completion of the external charging. The occupant door is unlocked by the user, but is not unlocked by a person other than the user. In the control described above, the control device does not switch the inlet to the unlocked state when the opening and closing member for the shareable space is unlocked. That is, the inlet is not unlocked though the opening and closing member is unlocked by the user or the predetermined third person. Thus, it is easier to suppress the inconvenience that may be caused when the inlet is unlocked while the user is absent.

According to the present disclosure, it is possible to appropriately control the switching between the locked state and the unlocked state of the inlet in the vehicle having the shareable space accessible to a third person other than the user of the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
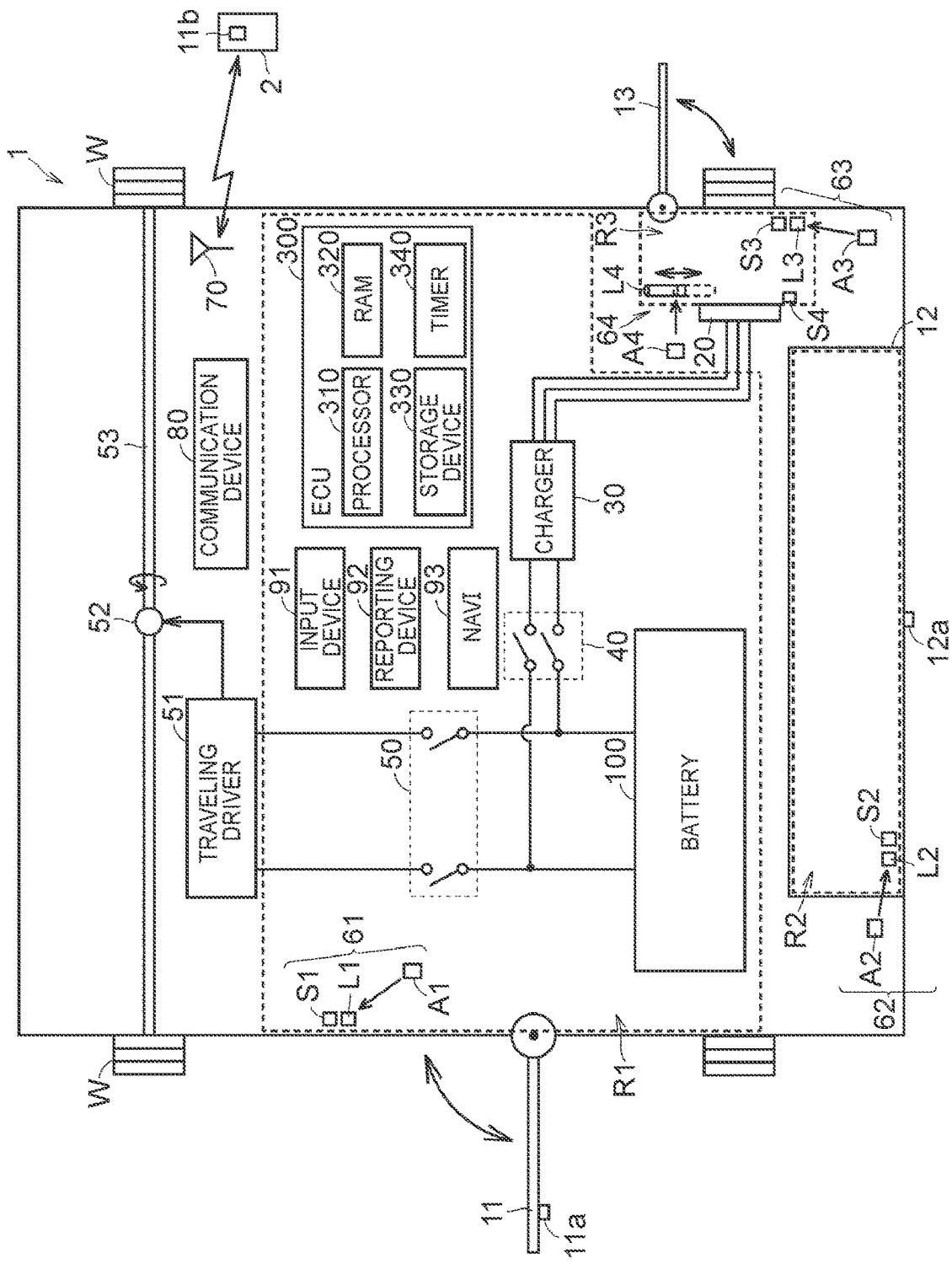
FIG. 1 is a diagram illustrating the configuration of a vehicle to which a vehicle control device according to an embodiment of the present disclosure is applied.

An embodiment of the present disclosure is described in detail with reference to the drawings. In the drawings, the same or corresponding parts are represented by the same reference symbols to omit redundant description. The following description is directed to an example in which a vehicle is a plug-in hybrid vehicle. The vehicle to which a vehicle control device is applied is not limited to the plug-in hybrid vehicle, but may be an electric vehicle having no engine. An electronic control unit is hereinafter abbreviated as "ECU".

FIG. 1 is a diagram illustrating the configuration of the vehicle to which the vehicle control device according to this embodiment is applied. Referring to FIG. 1, a vehicle 1 includes a vehicle cabin R1, a luggage space R2, and a power receiver R3. The vehicle 1 further includes an ECU 300. The ECU 300 according to this embodiment corresponds to an example of the "vehicle control device" according to the present disclosure.

The vehicle cabin R1 corresponds to an occupant space. The vehicle 1 includes a door 11 and a door-lock device (hereinafter referred to also as "D-lock device") 61. The door 11 opens or closes the vehicle cabin R1. The D-lock device 61 switches a locked state and an unlocked state of the door 11. The door 11 corresponds to an occupant door. When the door 11 is in the unlocked state, a user can get in the vehicle cabin R1 by opening the door 11 on the outside of the vehicle 1, or can get out of the vehicle 1 by opening the door 11 on the inside of the vehicle cabin R1. The door 11 is provided with a door-lock operation unit (hereinafter referred to also as "D-lock operation unit") 11a to be used for operating the D-lock device 61. The user operates the D-lock operation unit 11a to unlock the door 11 on the outside of the vehicle 1. FIG. 1 illustrates one occupant door (door 11) alone, but the vehicle 1 has a plurality of occupant doors (see FIG. 2). The D-lock device 61 and the D-lock operation unit 11a are provided for each door 11.

The vehicle 1 includes a trunk 12 and a back-lock device (hereinafter referred to also as "B-lock device") 62. The trunk 12 opens or closes the luggage space R2. The B-lock device 62 switches a locked state and an unlocked state of the trunk 12. When the trunk 12 is in the unlocked state, the user can open the trunk 12 on the outside of the vehicle 1. The trunk 12 is provided with a back-lock operation unit (hereinafter referred to also as "B-lock operation unit") 12a to be used for operating the B-lock device 62. The user operates the B-lock operation unit 12a to unlock the trunk 12 on the outside of the vehicle 1.

The power receiver R3 includes an inlet 20. The inlet 20 is connectable to a connector of an outlet cable (details are described later with reference to FIG. 5). The user connects the connector of the outlet cable to the inlet 20. The inlet 20 is provided with a connector-lock device (hereinafter referred to also as "C-lock device") 64 configured to switch a locked state and an unlocked state of the connector of the outlet cable. In the locked state, detachment of the connector from the inlet 20 is restricted. In the unlocked state, the detachment of the connector from the inlet 20 is permitted. In this embodiment, the power receiver R3 is provided on the side of a vehicle body at the rear of the vehicle 1. The position of the power receiver R3 is not limited to this position, but may be set arbitrarily. The vehicle 1 includes a lid 13 and a lid-lock device (hereinafter referred to also as "L-lock device") 63. The lid 13 opens or closes the power receiver R3. The L-lock device 63 switches a locked state and an unlocked state of the lid 13.

The D-lock device 61, the B-lock device 62, and the L-lock device 63 include open/close sensors S1, S2, and S3, lock mechanisms L1, L2, and L3, and actuators A1, A2, and A3, respectively. The door 11, the trunk 12, and the lid 13 are coupled to the vehicle body via open/close mechanisms (for example, hinges) to open or close openings formed in the vehicle body, respectively. The open/close sensors S1, S2, and S3 detect whether the door 11, the trunk 12, and the lid 13 are open or closed, and output detection results to the ECU 300, respectively. A publicly known sensor (for example, a courtesy switch, a limit switch, a proximity sensor, or a photoelectric sensor) may be employed as each of the open/close sensors S1 to S3. The lock mechanisms L1, L2, and L3 are driven by the actuators A1, A2, and A3 to keep the door 11, the trunk 12, and the lid 13 in the closed state, respectively. The actuators A1 to A3 are controlled by the ECU 300. The lock mechanisms L1, L2, and L3 may have engagement members (for example, pins or claws) for the door 11, the trunk 12, and the lid 13, respectively. The actuators A1, A2, and A3 may be motors configured to drive the engagement members to switch engagement and disengagement of the door 11, the trunk 12, and the lid 13 with the engagement members, respectively. The door 11, the trunk 12, and the lid 13 engage with the engagement members of the lock mechanisms L1, L2, and L3 to achieve a state in which the door 11, the trunk 12, and the lid 13 are forbidden to open (that is, the locked state), respectively. The lock mechanisms L1 to L3 and the actuators A1 to A3 are not limited to the lock mechanisms and the actuators described above, but publicly known lock mechanisms and publicly known actuators may be employed.

For example, the user can instruct the ECU 300 to lock or unlock the lid 13 through an input device 91 described later. In response to the instruction from the user, the ECU 300 controls the actuator A3 to switch an actuated state and an unactuated state of the L-lock device 63 (furthermore, the locked state and the unlocked state of the lid 13). When the lid 13 is in the unlocked state, the user can open the lid 13 on the outside of the vehicle 1.

The C-lock device 64 includes a connection sensor S4, a lock mechanism including a lock pin L4, and an actuator A4. The connection sensor S4 detects whether the connector of the outlet cable is connected to the inlet 20, and outputs a detection result to the ECU 300. A publicly known sensor (for example, a limit switch, a proximity sensor, or a photoelectric sensor) may be employed as the connection sensor S4. When the actuator A4 drives the lock pin L4, the inlet 20 is kept in the locked state. Details of the C-lock device 64 are described later (see FIG. 6 to FIG. 9).

The ECU 300 includes a processor 310, a random access memory (RAM) 320, a storage device 330, and a timer 340. Examples of the processor 310 include a central processing unit (CPU). The RAM 320 functions as a working memory configured to temporarily store data processed by the processor 310. The storage device 330 can save stored information. For example, the storage device 330 includes a read only memory (ROM) and a rewritable non-volatile memory. The storage device 330 stores programs and information for use in the programs (for example, maps, mathematical expressions, and various parameters). In this embodiment, the ECU 300 executes various types of control such that the processor 310 executes the programs stored in the storage device 330. The various types of control to be executed by the ECU 300 are not limited to execution by software, but may be executed by dedicated hardware (electronic circuit). The number of processors of the ECU 300 is arbitrary, and processors may be prepared for predetermined types of control, respectively.

The timer 340 notifies the processor 310 that a set time has arrived. When the time set in the timer 340 has arrived, the timer 340 transmits a signal indicating the time arrival to the processor 310. In this embodiment, a timer circuit is employed as the timer 340. The timer 340 may be implemented by software instead of hardware (timer circuit). The ECU 300 can acquire a current time using a real-time clock (RTC) circuit (not illustrated) in the ECU 300.

The vehicle 1 further includes an antenna 70 and a communication device 80. The communication device 80 includes various communication interfaces (I/Fs). The communication device 80 may include a data communication module (DCM). The ECU 300 performs wireless communication with communication devices outside the vehicle 1 through the communication device 80.

The ECU 300 receives a signal (for example, a radio wave) from an electronic key 2 via the antenna 70. The electronic key 2 includes a door-lock operation unit (hereinafter referred to also as "D-lock operation unit") 11*b* to be used for operating the D-lock device 61. The D-lock operation unit 11*b* includes a lock button and an unlock button. The antenna 70 includes external antennas and an internal antenna. The external antenna receives signals outside the vehicle. The internal antenna receives signals inside the vehicle. The external antennas are provided near the doors 11, the trunk 12, and the power receiver R3. Each external antenna receives a signal from the electronic key 2 located within a predetermined range around the external antenna (hereinafter referred to also as "antenna range"). The antenna range is set for each antenna. For example, the antenna range is set to about 70 cm around the antenna. When an operation is made using the electronic key 2, the ECU 300 performs predetermined authentication using a signal received from the electronic key 2, and validates the operation only when the authentication is successful. The operation made using the electronic key 2 is ineffective when the electronic key 2 is not located within the antenna range linked to the operation.

Figure 2:
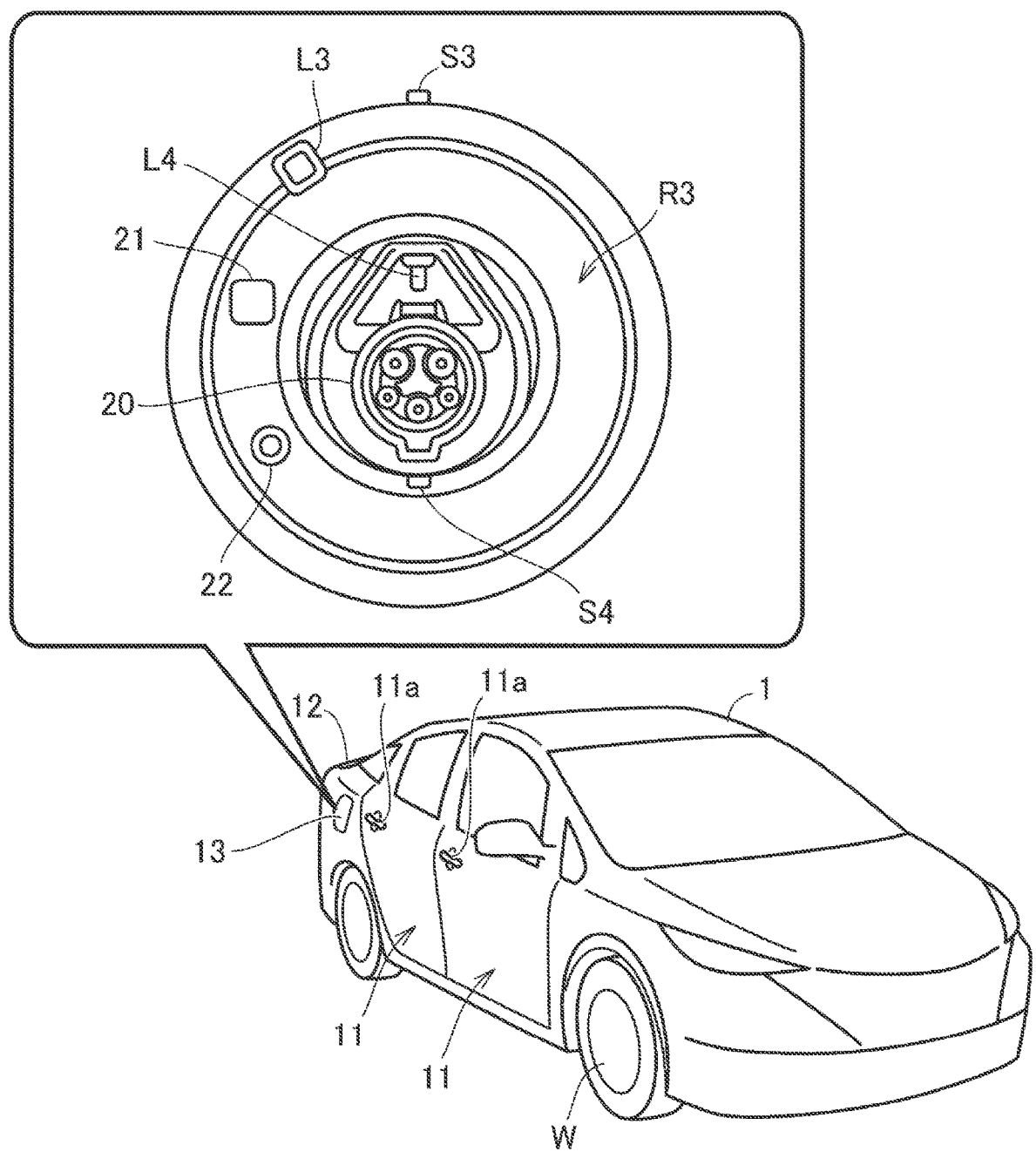
FIG. 2 is a diagram illustrating an appearance of the vehicle illustrated in FIG. 1 and the internal structure of a power receiver.

FIG. 2 is a diagram illustrating an appearance of the vehicle 1 and the internal structure of the power receiver R3. Referring to FIG. 2 together with FIG. 1, the vehicle 1 has a double-row seat structure, and includes four doors 11. FIG. 2 illustrates two doors 11 on a near side, but two other doors 11 are present on a far side hidden by the vehicle body. The D-lock operation unit 11*a* is provided on a handle of each door 11. In FIG. 2, the B-lock operation unit 12*a* illustrated in FIG. 1 is hidden by the vehicle body, but is provided on a handle of the trunk 12 (see FIG. 4).

An upper part of FIG. 2 illustrates the internal structure of the power receiver R3 exposed when the lid 13 is open. The power receiver R3 includes a charge indicator 21 and a connector-lock switch 22 in addition to the inlet 20, the lock pin L4, and the connection sensor S4. When the lid 13 is open, the inlet 20, the charge indicator 21, and the connector-lock switch 22 are exposed.

The charge indicator 21 is controlled by the ECU 300 to report, to the user, whether charging is being performed, and whether an abnormality occurs. In this embodiment, the charge indicator 21 is ON to indicate "currently charging", OFF to indicate "no charging (state in which charging is not being performed)", and blinks to indicate "charging is forbidden (abnormality occurs)".

The user can operate the C-lock device 64 through the connector-lock switch 22. When the user operates the connector-lock switch 22, the ECU 300 controls the actuator A4 to switch an actuated state and an unactuated state of the C-lock device 64 (furthermore, a locked state and an unlocked state of the inlet 20). The operation for the connector-lock switch 22 is effective only when the electronic key 2 is located within an antenna range of a predetermined antenna 70 (in this embodiment, the external antenna provided near the power receiver R3). For example, when the inlet 20 is in the locked state, the user carrying the electronic key 2 pushes the connector-lock switch 22 within the antenna range. Then, the inlet 20 is unlocked. When the user pushes the connector-lock switch 22 again, the inlet 20 is locked again.

Figure 3:
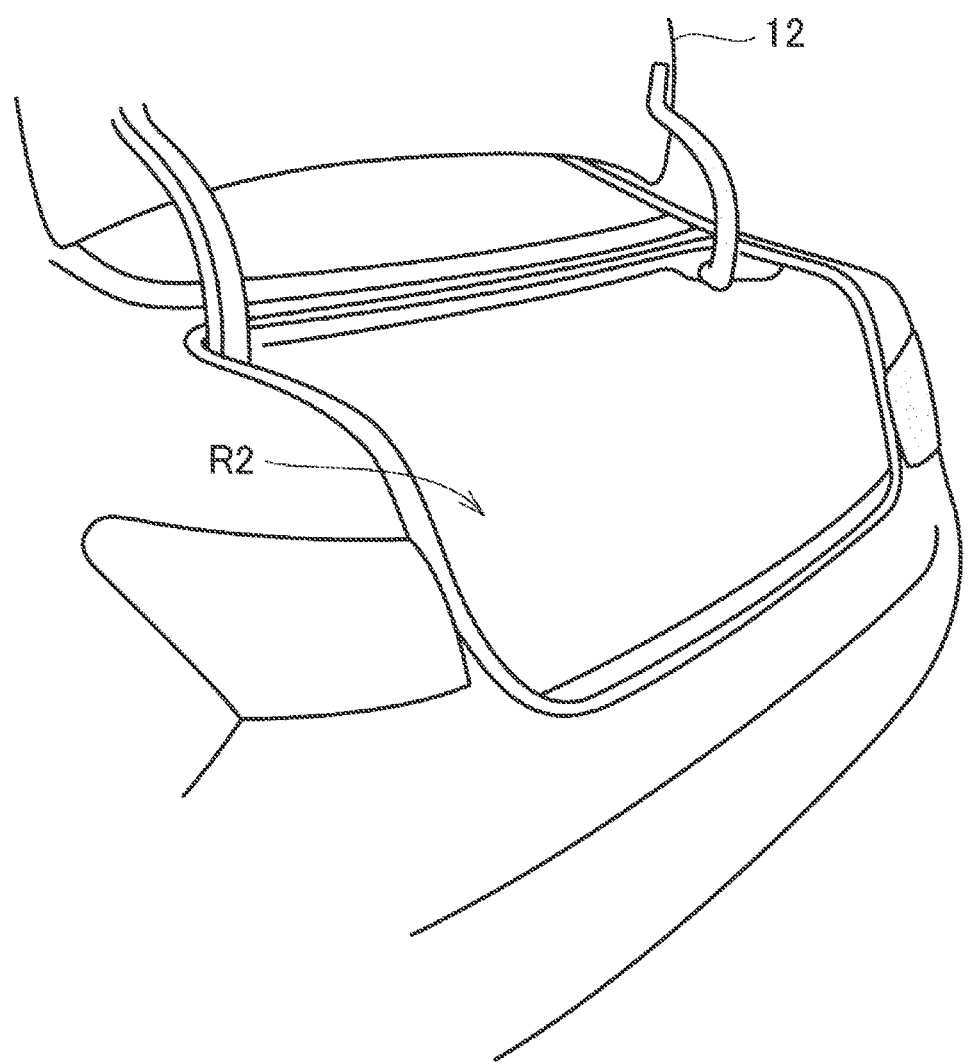
FIG. 3 is a diagram illustrating an example of a luggage space to be used as a delivery box.

FIG. 3 is a diagram illustrating an example of the luggage space R2 to be opened or closed by the trunk 12. Referring to FIG. 3 together with FIG. 1 and FIG. 2, the trunk 12 is provided at the rear of the vehicle 1. In FIG. 2, the trunk 12 is closed. In FIG. 3, the trunk 12 is open. The luggage space R2 can house luggage. The user opens the trunk 12 to load luggage in the luggage space R2 on the outside of the vehicle 1. The luggage space R2 according to this embodiment is an enclosed luggage space that is not connected to the vehicle cabin R1 (occupant space).

Figure 4:
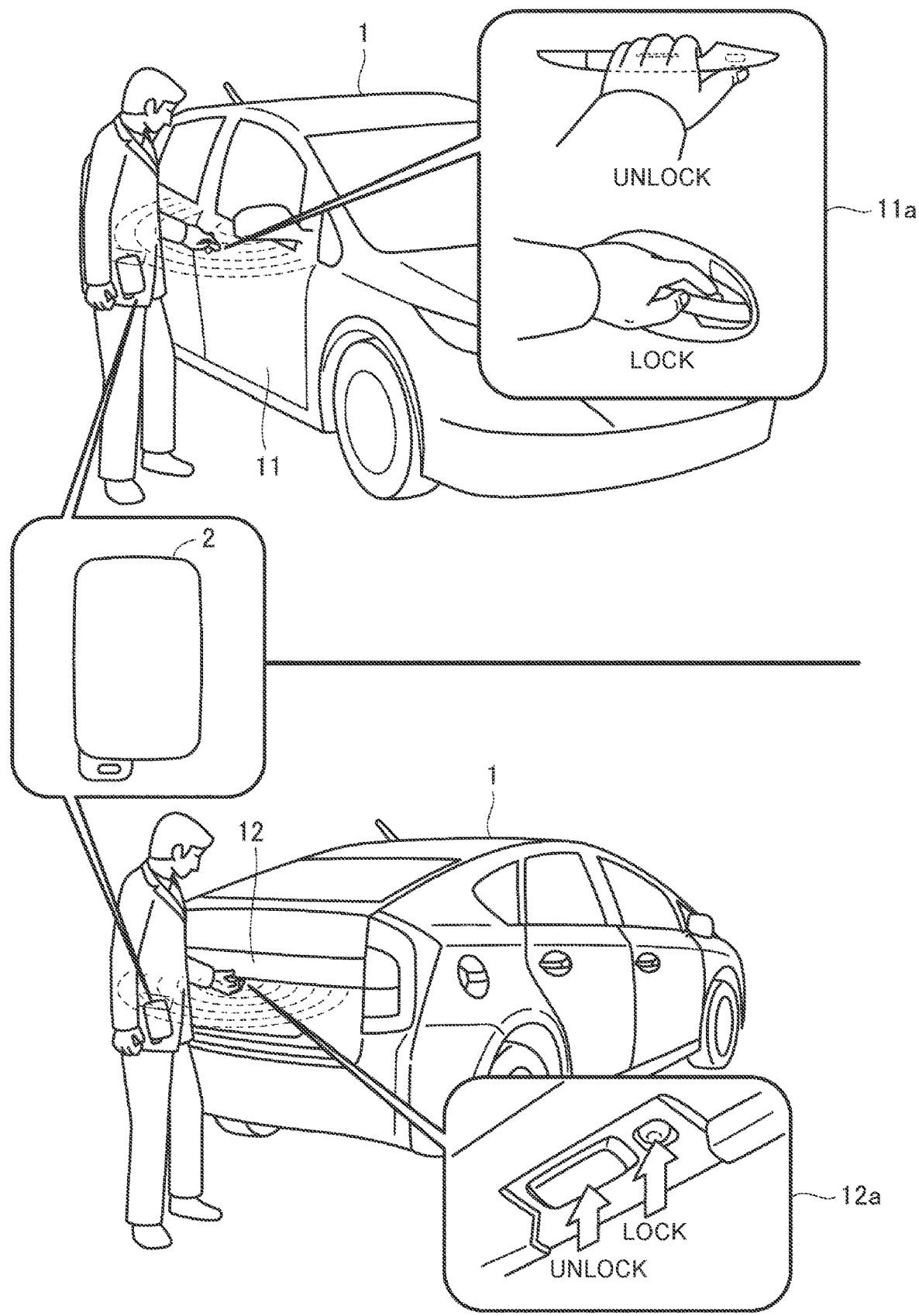
FIG. 4 is a diagram illustrating examples of a D-lock operation unit and a B-lock operation unit illustrated in FIG. 1.

FIG. 4 is a diagram illustrating examples of the D-lock operation unit 11*a* and the B-lock operation unit 12*a* illustrated in FIG. 1. Referring to FIG. 4 together with FIG. 1, the user can operate the D-lock device 61 and the B-lock device 62 through the D-lock operation unit 11*a* and the B-lock operation unit 12*a*, respectively. When the user operates the D-lock operation unit 11*a*, the ECU 300 controls the actuator A1 to switch an actuated state and an unactuated state of the D-lock device 61 (furthermore, the locked state and the unlocked state of the door 11). When the user operates the B-lock operation unit 12*a*, the ECU 300 controls the actuator A2 to switch an actuated state and an unactuated state of the B-lock device 62 (furthermore, the locked state and the unlocked state of the trunk 12). The operations for the D-lock operation unit 11*a* and the B-lock operation unit 12*a* are effective only when the electronic key 2 is located within antenna ranges of predetermined antennas 70 (for example, the following external antennas). As illustrated in FIG. 4, each of the D-lock operation unit 11*a* and the B-lock operation unit 12*a* includes a lock button and an unlock button. When the user carrying the electronic key 2 pushes the lock button of the D-lock operation unit 11*a* within the antenna range of the external antenna provided near the door 11, the associated door 11 is locked. When the user pushes the unlock button of the D-lock operation unit 11*a*, the associated door 11 is unlocked. When the user carrying the electronic key 2 pushes the lock button of the B-lock operation unit 12a within the antenna range of the external antenna provided near the trunk 12, the trunk 12 is locked. When the user pushes the unlock button of the B-lock operation unit 12a, the trunk 12 is unlocked.

Referring back to FIG. 1, the vehicle 1 is a four-wheel motor vehicle including a battery 100 (on-board battery), a traveling driver 51, a power transmission gear 52, a driving shaft 53, and driving wheels W. The battery 100 stores electric power for electric traveling, and supplies the electric power to the traveling driver 51. Driving power output from the traveling driver 51 is transmitted to the driving shaft 53 via the power transmission gear 52 to rotate the driving shaft 53. The driving wheels W (for example, front wheels) of the vehicle 1 are attached to both ends of the driving shaft 53, and rotate together with the driving shaft 53. The drive system of the vehicle 1 is not limited to the front-wheel drive, but may be rear-wheel drive or four-wheel drive.

The traveling driver 51 includes a power control unit (PCU) (not illustrated) and a motor generator (MG) (not illustrated). Examples of the MG include a three-phase alternating-current (AC) motor generator. A rotation shaft of the MG is mechanically connected to the power transmission gear 52. The PCU includes a converter and an inverter (both of them are not illustrated) to be controlled by the ECU 300. During power running by the MG, the PCU converts electric power stored in the battery 100 into AC power, and supplies the AC power to the MG. Using the supplied electric power, the MG rotates the driving wheels W. During electric power generation by the MG, the PCU rectifies generated electric power, and supplies the rectified electric power to the battery 100. The traveling driver 51 further includes an engine (internal combustion engine) (not illustrated). An output shaft of the engine is mechanically connected to a generator (for example, a three-phase AC motor generator) (not illustrated) and the power transmission gear 52 via a power split device such as a planetary gearing mechanism. The power split device splits driving power output from the engine into driving power for driving the generator and driving power for driving the driving wheels W. For example, electric power generated by the generator is supplied to the battery 100 via the PCU. The vehicle 1 is a hybrid vehicle configured to travel using both the electric power stored in the battery 100 and the power output from the engine (not illustrated).

The battery 100 includes a secondary battery such as a lithium ion battery or a nickel-metal hydride battery, and a monitoring unit configured to monitor conditions of the battery 100 (both of them are not illustrated). The secondary battery may be an assembled battery. A different power storage device such as an electric double layer capacitor may be employed in place of the secondary battery. The battery 100 according to this embodiment corresponds to an example of the "power storage device" according to the present disclosure. The monitoring unit includes various sensors configured to detect the conditions of the battery 100 (for example, temperature, current, and voltage), and outputs detection results to the ECU 300. The ECU 300 acquires the conditions of the battery 100 (for example, temperature, current, voltage, and state of charge (SOC)) based on the outputs from the monitoring unit (detection values from various sensors).

The vehicle 1 further includes a charger 30 (on-board charger), a charging relay 40, and a system main relay (SMR) 50.

The SMR 50 is located between the traveling driver 51 and the battery 100, and is controlled by the ECU 300 so that the SMR 50 is opened or closed. Examples of the SMR 50 include an electromagnetic mechanical relay. When the SMR 50 is open (interrupted state), a current is interrupted by the SMR 50. When the SMR 50 is closed (connected state), electric power can be exchanged between the battery 100 and the traveling driver 51.

The charger 30 includes circuits (not illustrated) configured to perform predetermined processes for electric power input to the inlet 20 from the outside of the vehicle 1. For example, the charger 30 includes a power conversion circuit and a filter circuit. The power conversion circuit converts AC power supplied from power supply equipment outside the vehicle into direct-current (DC) power. The filter circuit removes noise. Through the processes performed by those circuits, electric power (DC power) appropriate to charging of the battery 100 is output from the charger 30 to the battery 100, thereby charging the battery 100. Thus, the vehicle 1 is configured such that the battery 100 is externally charged (that is, the battery 100 of the vehicle 1 is charged with electric power supplied to the inlet 20 from the power supply equipment outside the vehicle). Although FIG. 1 illustrates only the inlet 20 and the charger 30, the vehicle 1 may include a plurality of inlets and a plurality of chargers adaptable to a plurality of types of power supply system (for example, an AC system and a DC system), respectively.

The charging relay 40 is provided on a current path connected to the charger 30 after branching off from a current path connecting the battery 100 and the SMR 50. The state of the charging relay 40 (connected or interrupted) is controlled by the ECU 300. When the charging relay 40 is open (interrupted state), a charging path from the inlet 20 to the battery 100 is interrupted. When the charging relay 40 is closed (connected state), electric power can be suppled from the inlet 20 to the battery 100.

The vehicle 1 further includes the input device 91, a reporting device 92, and a navigation system (hereinafter referred to also as "NAVI") 93.

The input device 91 receives user's input operations. The input device 91 is operated by the user, and outputs a signal to the ECU 300 in response to the user's operation. Communication may be performed by wire or wireless. Examples of the input device 91 include various switches (such as a push-button switch and a slide switch), various pointing devices (such as a mouse and a touch pad), a keyboard, and a touch panel. The input device 91 may include a smart speaker configured to receive voice input.

The reporting device 92 performs a predetermined reporting process in response to a request from the ECU 300. Examples of the reporting device 92 include a display device (for example, an instrument panel or a head-up display), a loudspeaker, and an indicator.

The NAVI 93 includes a touch panel display, a Global Positioning System (GPS) module, and a storage device (all of them are not illustrated). The storage device stores map information. The touch panel display receives user's input operations, and displays a map and other information. The GPS module receives a signal from a GPS satellite (not illustrated) (hereinafter referred to as "GPS signal"). The NAVI 93 can determine the position of the vehicle 1 using the GPS signal. The NAVI 93 displays the position of the vehicle 1 on the map in real time. The ECU 300 can acquire positional information of the vehicle 1 from the NAVI 93.

Figure 5:
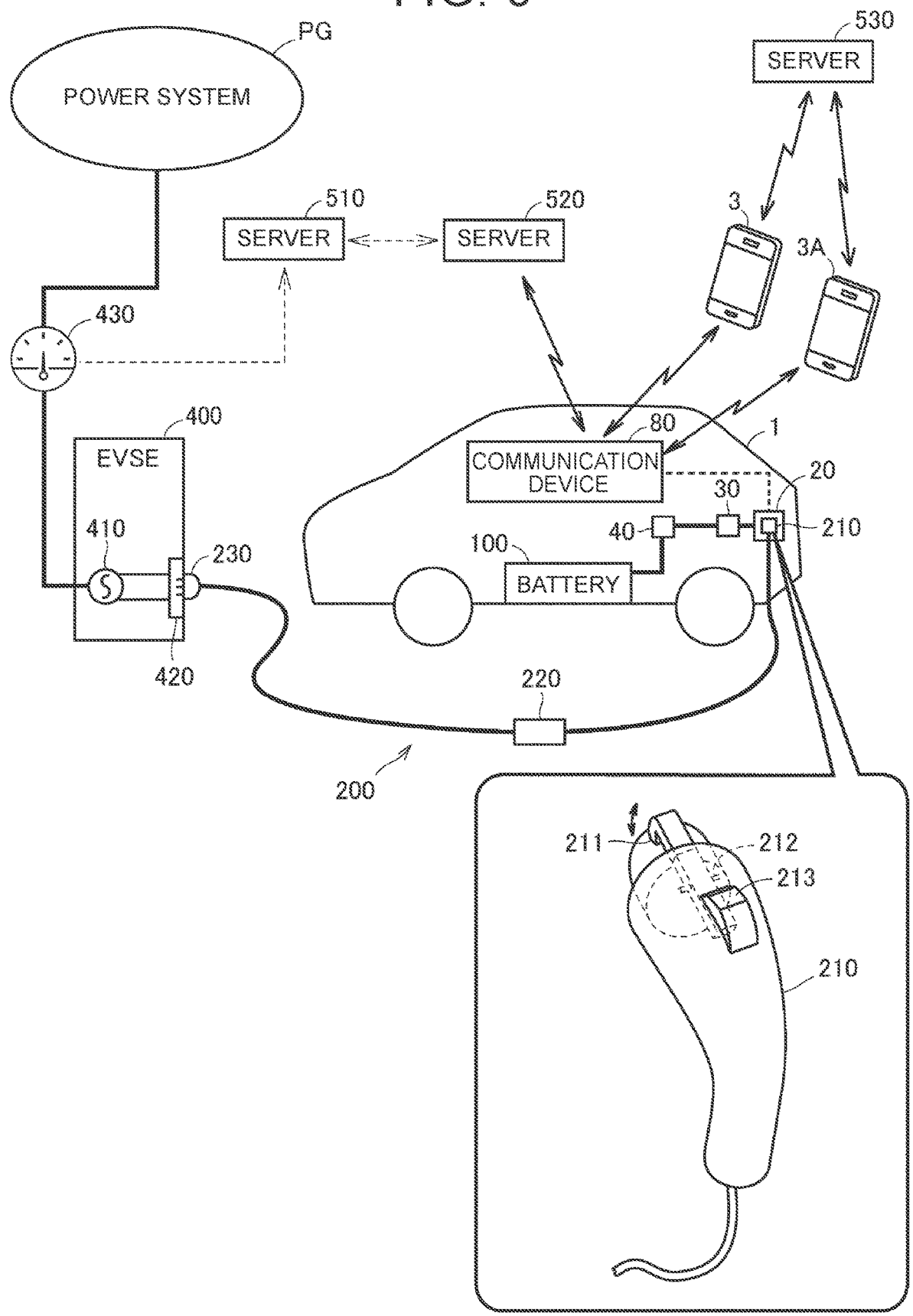
FIG. 5 is a diagram illustrating an example of external charging of the vehicle illustrated in FIG. 1.

FIG. 5 is a diagram illustrating an example of external charging of the vehicle 1. Referring to FIG. 5 together with FIG. 1, the vehicle 1 is electrically connected to outdoor EVSE 400 via an outlet cable 200 while being parked in a parking space of a residence (for example, a user's house) where the EVSE 400 is installed. The term "EVSE" is an abbreviation for electric vehicle supply equipment. The EVSE 400 is non-public power supply equipment to be used only by the user and a user's family.

The EVSE 400 includes an AC power supply circuit 410 and an AC outlet 420. Examples of the AC outlet 420 include a household AC outlet. The AC power supply circuit 410 is connected to a power system PG via a smart meter 430. The power system PG is provided by a power company. The AC power supply circuit 410 converts AC power supplied from the power system PG into predetermined AC power, and outputs the predetermined AC power to the AC outlet 420. The smart meter 430 measures the amount of electric power supplied from the EVSE 400 to the vehicle 1. The smart meter 430 measures electric power usage at every elapse of a predetermined time (for example, 30 minutes), stores the measured electric power usage, and transmits the measured electric power usage to a server 510.

The outlet cable 200 has a connector 210 at a first end, and a plug 230 at a second end opposite to the first end. A control box 220 is provided midway along the outlet cable 200. The connector 210 and the plug 230 are connected via an electric wire and the control box 220. For example, the control box 220 includes a charging circuit interrupt device (CCID). The CCID is a circuit configured to switch connection and interruption of a current path from the plug 230 to the connector 210. The connector 210 is connectable to the inlet 20 of the vehicle 1. The plug 230 is connectable to the AC outlet 420 of the EVSE 400. When the plug 230 of the outlet cable 200 is connected to the AC outlet 420 of the EVSE 400 and the connector 210 of the outlet cable 200 is connected to the inlet 20 of the vehicle 1, the vehicle 1 and the EVSE 400 can communicate with each other, and electric power supplied from the power system PG to the EVSE 400 can be supplied from the EVSE 400 to the vehicle 1 through the outlet cable 200.

The connector 210 of the outlet cable 200 includes a link 211, a shaft 212, and a push-button 213. In this embodiment, the locked state and the unlocked state of the inlet 20 are switched such that the ECU 300 illustrated in FIG. 1 controls the C-lock device 64 in a state in which the connector 210 is connected to the inlet 20. FIG. 6 to FIG. 9 are diagrams illustrating first to fourth states in a case where the connector 210 of the outlet cable 200 is connected to the inlet 20 and the inlet 20 is unlocked.

Figure 6:
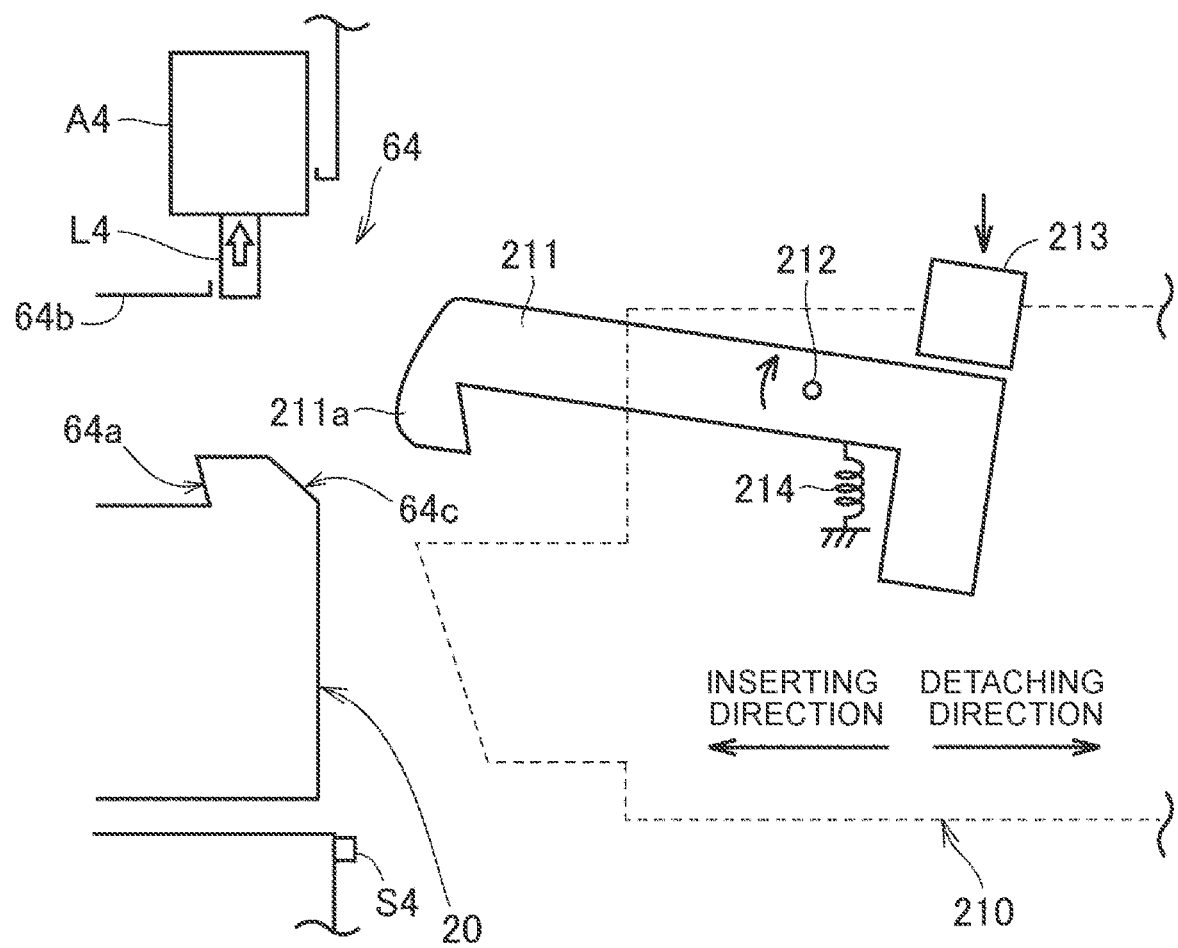
FIG. 6 is a diagram illustrating a first state in a case where a connector of an outlet cable illustrated in FIG. 5 is connected to an inlet of the vehicle and the inlet is unlocked.

Referring to FIG. 6 together with FIG. 1, the C-lock device 64 includes the lock pin L4 and the electromagnetic actuator A4 configured to drive the lock pin L4. The C-lock device 64 has a stepped portion 64a and a link hole 64b. The stepped portion 64a and the link hole 64b are provided above the inlet 20. The link 211 is attached to rotate about the shaft 212. A projection 211a engageable with the stepped portion 64a is formed at the distal end of the link 211. The push-button 213 and a spring 214 are provided at the proximal end of the link 211. The spring 214 urges the link 211. The inlet 20 illustrated in FIG. 6 is in the unlocked state. When the inlet 20 is in the unlocked state, the actuator A4 does not drive the lock pin L4. The lock pin L4 retracts upward (toward the actuator A4) away from the link 211.

Figure 7:
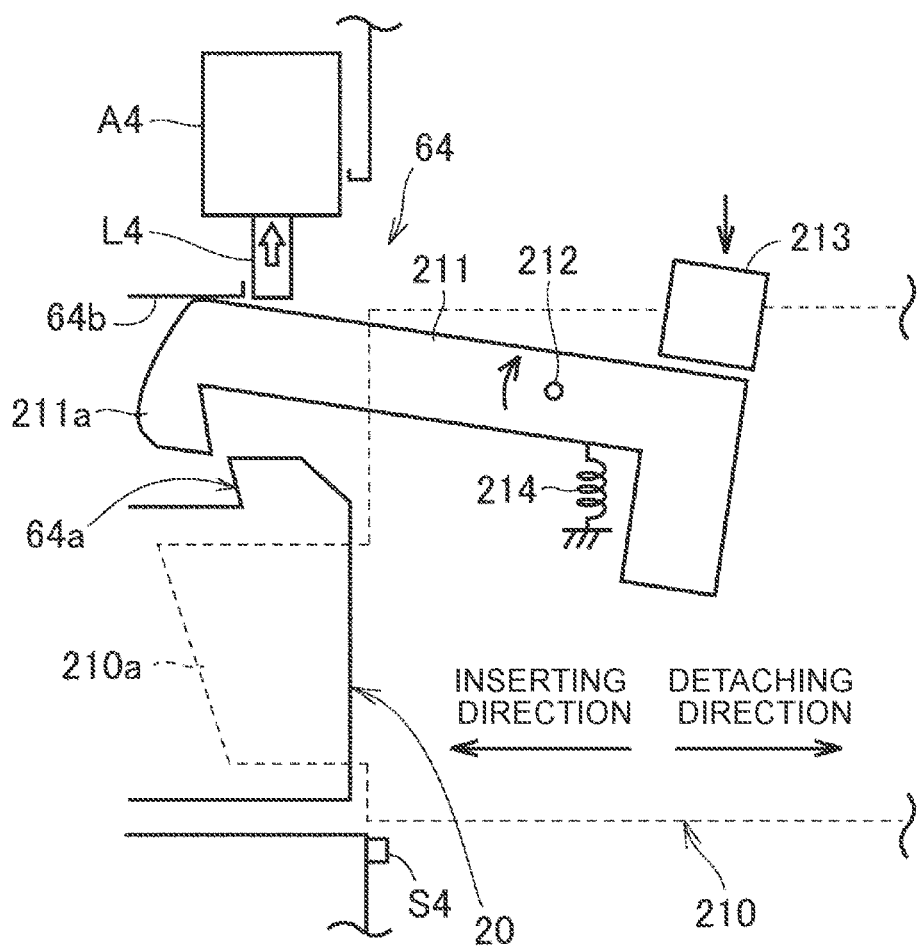
FIG. 7 is a diagram illustrating a second state in the case where the connector of the outlet cable illustrated in FIG. 5 is connected to the inlet of the vehicle and the inlet is unlocked.
Figure 8:
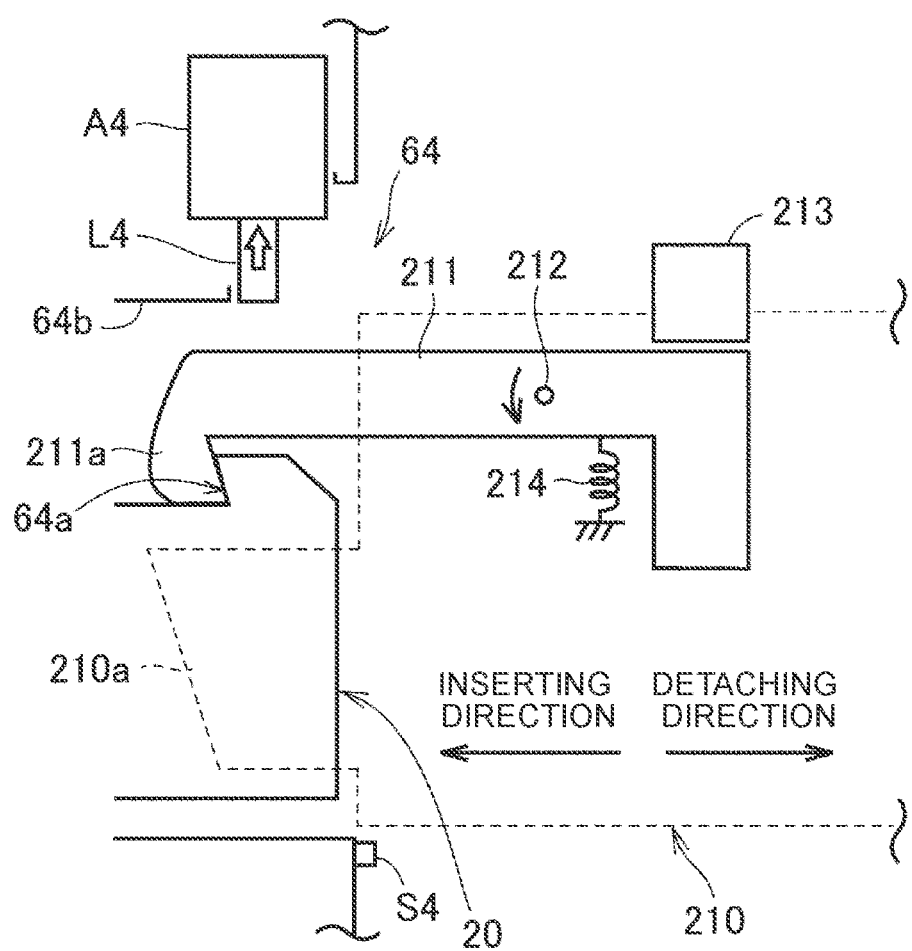
FIG. 8 is a diagram illustrating a third state in the case where the connector of the outlet cable illustrated in FIG. 5 is connected to the inlet of the vehicle and the inlet is unlocked.

To insert the connector 210 into the inlet 20, the user pushes the push-button 213 in an arrow direction of FIG. 6. Thus, the link 211 rotates about the shaft 212 in an arrow direction of FIG. 6. The user can connect a charging terminal 210a of the connector 210 to the inlet 20 as illustrated in FIG. 7 by moving the connector 210 toward the inlet 20 while pushing the push-button 213. At this time, the link 211 of the connector 210 is inserted into the link hole 64b. The connection sensor S4 detects that the connector 210 is connected to the inlet 20. When the user releases the push-button 213, the link 211 rotates about the shaft 212 in an arrow direction of FIG. 8 by an elastic force of the spring 214 as illustrated in FIG. 8. Thus, the projection 211a of the link 211 engages with the stepped portion 64a. Although FIG. 6 to FIG. 8 illustrate the example in which the user moves the connector 210 toward the inlet 20 while pushing the push-button 213, the user may connect the connector 210 to the inlet 20 without pushing the push-button 213. The link 211 rotates about the shaft 212 in the arrow direction of FIG. 6 also when the user pushes the distal end of the link 211 against an inclined portion 64c (FIG. 6).

The inlet 20 illustrated in FIG. 8 is in the unlocked state. Therefore, when the user pushes the push-button 213 again, the link 211 rotates about the shaft 212 as illustrated in FIG. 7. Thus, the distal end of the link 211 (including the projection 211a) separates from the stepped portion 64a, and the projection 211a of the link 211 disengages from the stepped portion 64a. The user can detach the connector 210 from the inlet 20 as illustrated in FIG. 6 by moving the connector 210 away from the inlet 20 while pushing the push-button 213. When the connector 210 is detached from the inlet 20, the connection sensor S4 detects that the connector 210 is disconnected from the inlet 20. Thus, when the inlet 20 is in the unlocked state, the detachment of the connector 210 is permitted.

Figure 9:
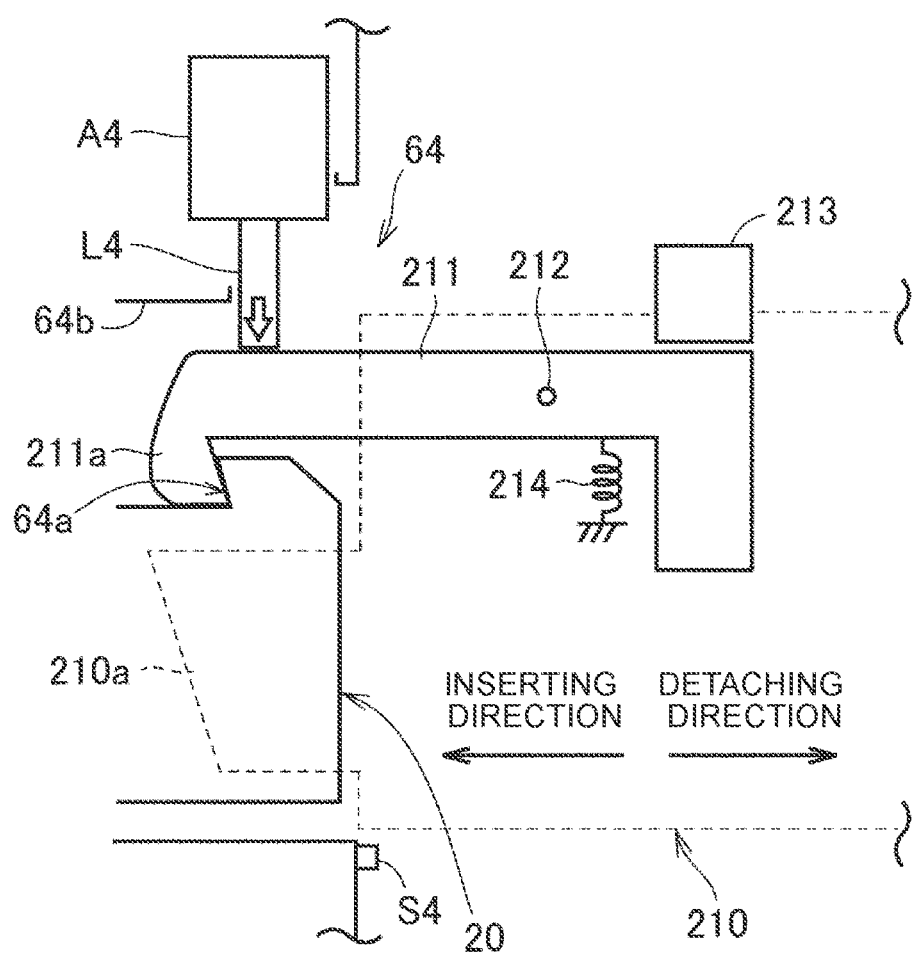
FIG. 9 is a diagram illustrating a fourth state in the case where the connector of the outlet cable illustrated in FIG. 5 is connected to the inlet of the vehicle and the inlet is unlocked.

When the actuator A4 drives the lock pin L4 in a state in which the projection 211a of the link 211 engages with the stepped portion 64a (see FIG. 8), the inlet 20 is locked as illustrated in FIG. 9. The lock pin L4 protrudes toward the link 211 such that the actuator A4 causes the lock pin L4 to slide downward. The lock pin L4 presses the distal end of the link 211 (including the projection 211a) downward (toward the inlet 20). Therefore, the projection 211a and the stepped portion 64a are fixed in an engaged state. Thus, the connector 210 does not detach from the inlet 20. Since the rotation of the link 211 is restricted by the lock pin L4, the user cannot rotate the link 211 by operating the push-button 213. Thus, when the inlet 20 is in the locked state, the detachment of the connector 210 is restricted. When the actuator A4 stops driving the lock pin L4, the lock pin L4 slides upward (toward the actuator A4), and the inlet 20 is unlocked again as illustrated in FIG. 8.

Referring back to FIG. 5 together with FIG. 1, in this embodiment, the CCID in the control box 220 interrupts the current path when the inlet 20 is unlocked while the battery 100 is being externally charged with electric power supplied from the EVSE 400. Thus, the power supply from the EVSE 400 to the inlet 20 (furthermore, charging of the battery 100) is stopped. It is not essential to stop the charging of the battery 100 when the inlet 20 is unlocked. For example, when the inlet 20 is unlocked during the external charging, the external charging current may be limited to a predetermined value (for example, about 16 A) or smaller, and the external charging may be continued in the state in which the charging current is limited.

The server 510 belongs to a power transmission/distribution utility. In this embodiment, a power company serves both as a power generation utility and as the power transmission/distribution utility. The power company constructs a power grid (that is, the power system PG) by power plants (not illustrated) and power transmission/distribution facilities (not illustrated), and performs maintenance and management of the server 510, the smart meter 430, the EVSE 400, and the power system PG. In this embodiment, the power company corresponds to a system operator that operates the power system PG.

The server 520 is communicable with the server 510 and the vehicle 1. The server 520 belongs to an aggregator. The aggregator is an electric utility that provides energy management services by aggregating demand side resources (DSRs) owned by demanders. In this embodiment, the vehicle 1 corresponds to the DSR. For example, the power company can adjust demand-supply balance for electric power by demand response (hereinafter referred to also as "DR") in cooperation with the aggregator. The DR is a method for adjusting demand-supply balance for electric power by sending predetermined requests to demanders with demand response signals (hereinafter referred to also as "DR signals").

In this embodiment, the vehicle 1, the smart meter 430, the power system PG, and the servers 510 and 520 constitute a vehicle grid integration (VGI) system. The vehicle 1 performs wireless communication with the server 520 through the communication device 80. When the vehicle 1 receives the DR signal, the user performs charging based on the DR signal using the EVSE 400 and the vehicle 1 to contribute to demand-supply adjustment in the power system PG. The user of the vehicle 1 and an electric utility (for example, a power company or an aggregator) may make an agreement that, when the user of the vehicle 1 contributes to demand-supply adjustment in the power system PG, an incentive is paid from the electric utility to the user of the vehicle 1 depending on a contribution amount. For example, the contribution amount is measured by the smart meter 430.

The method for measuring the contribution amount by the electric utility may be any method without being limited to the measurement method using the smart meter 430. The electric utility may determine the contribution amount using a measurement value from a watt-hour meter (not illustrated) in the EVSE 400. The electric utility may determine the contribution amount using a measurement value from a sensor mounted on the vehicle 1. A portable outlet cable may have a function of a meter, and the electric utility may determine the contribution amount based on an electric power amount measured by the outlet cable.

The server 530 belongs to a delivery service. A mobile terminal 3A is an electronic device carried by a delivery person of the delivery service. Although FIG. 5 illustrates one mobile terminal 3A alone, the mobile terminal 3A is carried by each delivery person. Each mobile terminal 3A has identification information for identifying the mobile terminal (hereinafter referred to also as "terminal ID"). The server 530 manages pieces of information on the mobile terminals 3A (furthermore, pieces of information on delivery persons) while distinguishing the pieces of information based on the terminal IDs. The terminal ID of the mobile terminal 3A serves also as information for identifying a delivery person (delivery person ID). The server 530 performs wireless communication with each mobile terminal 3A. Each mobile terminal 3A may transmit information indicating a current position to the server 530.

A mobile terminal 3 is an electronic device carried by the user of the vehicle 1. The server 530 also performs wireless communication with the mobile terminal 3. For example, the mobile terminals 3 and 3A communicate with the server 530 via a base station and the Internet (both of them are not illustrated). The mobile terminals 3 and 3A perform wireless communication with the communication device 80 mounted on the vehicle 1. The mobile terminal 3A and the communication device 80 perform near field communication such as Bluetooth (registered trademark) (that is, direct communication within a predetermined range around the vehicle). For example, the mobile terminal 3 communicates with the communication device 80 via a base station and the Internet (both of them are not illustrated). In this embodiment, a smartphone having a touch panel display is employed as each of the mobile terminals 3 and 3A. The mobile terminals 3 and 3A are not limited to the smartphone, but may be any other mobile terminal such as a tablet terminal or a wearable device (for example, a smart watch).

In this embodiment, the luggage space R2 to be opened or closed by the trunk 12 corresponds to a delivery space. That is, the luggage space R2 is used as a delivery box. Therefore, the trunk 12 may be unlocked by a delivery person as well as the user. When the trunk 12 is unlocked by the delivery person and the inlet 20 is unlocked in conjunction with the unlocking of the trunk 12, someone may detach the connector 210 of the outlet cable 200 from the inlet 20 while the user is away from the vehicle 1. Further, someone may steal the outlet cable 200. When the inlet 20 is unlocked, external charging of the battery 100 is limited. Thus, there is a possibility that the battery 100 is not sufficiently charged when the user returns to the vehicle 1.

The ECU 300 according to this embodiment has the following configuration to solve the problems described above. With the ECU 300 having the following configuration, switching between the locked state and the unlocked state of the inlet 20 is appropriately controlled in the vehicle 1 that can be used as the delivery box.

Figure 10:
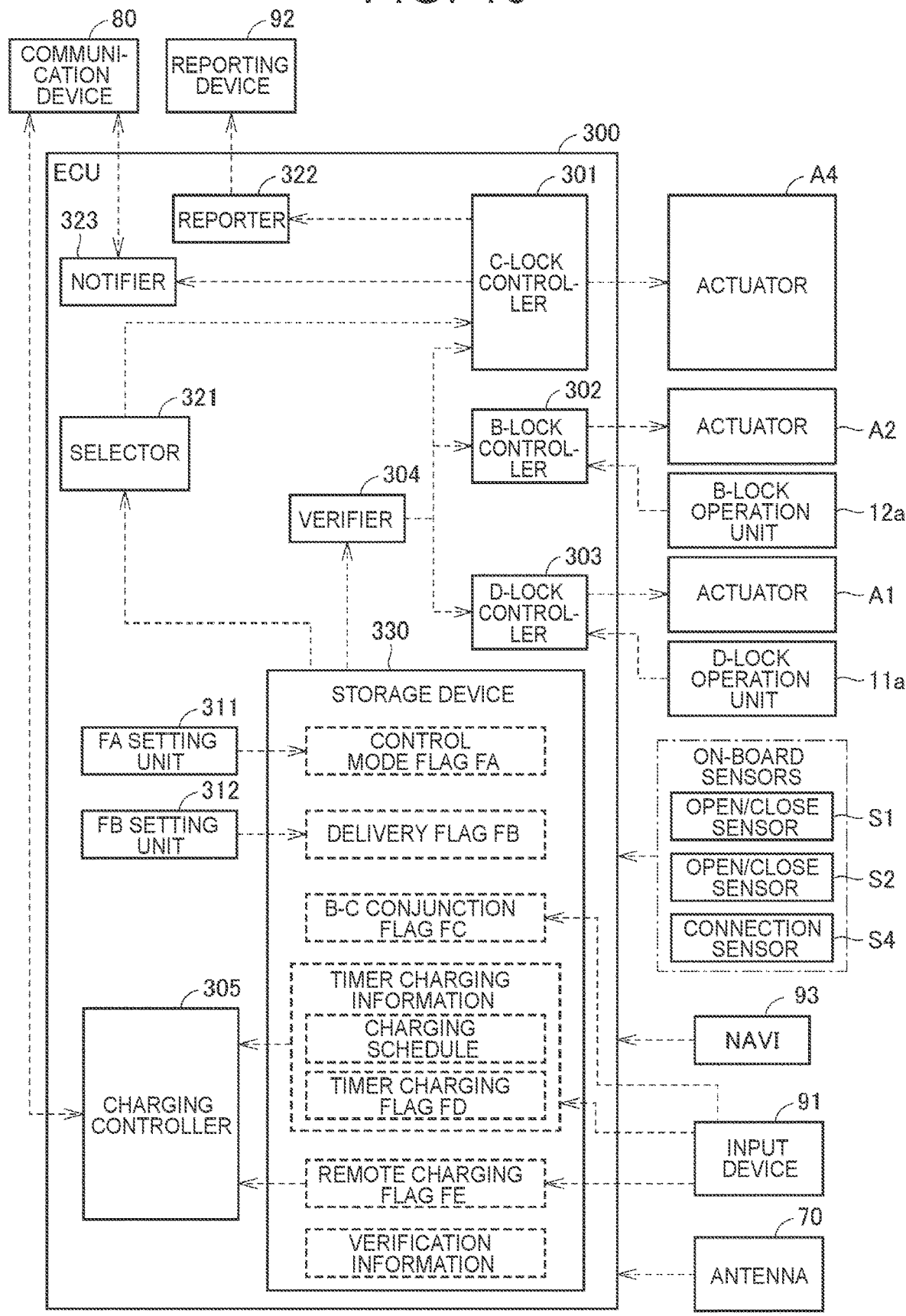
FIG. 10 is a functional block diagram illustrating functions of components of the vehicle control device according to the embodiment of the present disclosure.

FIG. 10 is a functional block diagram illustrating functions of components of the ECU 300. Referring to FIG. 10 together with FIG. 1, the ECU 300 includes a C-lock controller 301, a B-lock controller 302, a D-lock controller 303, a verifier 304, a charging controller 305, an FA setting unit 311, an FB setting unit 312, a selector 321, a reporter 322, and a notifier 323. In the ECU 300, the components described above are implemented by the processor 310 and programs executed by the processor 310. The components described above may be implemented by dedicated hardware (electronic circuit) without being limited to the above implementation.

The verifier 304 performs authentication using input authentication information, and outputs an authentication result. In this embodiment, the storage device 330 stores verification information. The verification information includes verification information for the user, and verification information for a third person (for example, a delivery person). When the input authentication information matches the verification information for the user, the verifier 304 outputs information indicating that the authentication is successful for the user. When the input authentication information matches the verification information for the third person, the verifier 304 outputs information indicating that the authentication is successful for the third person. When the input authentication information matches neither the verification information for the user nor the verification information for the third person, the verifier 304 outputs information indicating that the authentication is unsuccessful.

In this embodiment, only the user is permitted to lock or unlock the door 11 using the D-lock operation unit 11a (see FIG. 4). The signal from the electronic key 2 contains authentication information that matches the verification information for the user. When the signal from the electronic key 2 is received by the antenna 70, the verifier 304 authenticates the user successfully. When the D-lock operation unit 11a is operated, the D-lock controller 303 acquires an authentication result from the verifier 304, and determines whether the operator of the D-lock operation unit 11a is the user using the authentication result. When determination is made that the operator is the user, the D-lock controller 303 controls the actuator A1 in response to the operation. The actuator A1 switches the unlocked state and the locked state of the door 11.

In this embodiment, the luggage space R2 of the vehicle 1 (see FIG. 1 and FIG. 3) is used as the delivery box. Therefore, the user and a predetermined third person (for example, a delivery person of a delivery service) are permitted to lock or unlock the trunk 12 using the B-lock operation unit 12a (see FIG. 4). When the B-lock operation unit 12a is operated, the B-lock controller 302 acquires an authentication result from the verifier 304, and determines whether the operator of the B-lock operation unit 12a is the user or the predetermined third person using the authentication result. When determination is made that the operator is the user or the predetermined third person, the B-lock controller 302 controls the actuator A2 in response to the operation. The actuator A2 switches the unlocked state and the locked state of the trunk 12.

For example, when the user sends a delivery request to a delivery service, the server 530 illustrated in FIG. 5 transmits verification information for a delivery person (for example, a scheduled time frame for delivery and a delivery person ID) to the user's mobile terminal 3. The user can set the verification information for the delivery person in the ECU 300 through the mobile terminal 3 or the input device 91. The set verification information is stored in the storage device 330. The verification information for the delivery person has a time limit, and is effective only within a set time frame. The delivery person carries the mobile terminal 3A illustrated in FIG. 5. When the delivery person approaches the vehicle 1, the communication device 80 receives authentication information (that is, the delivery person ID) from the mobile terminal 3A. When the delivery person ID received by the communication device 80 matches the verification information for the delivery person, the verifier 304 authenticates the third person successfully. Therefore, the delivery person can lock or unlock the trunk 12 by operating the B-lock operation unit 12a within the scheduled time frame for delivery.

When a third person unlocks the trunk 12 during external charging, the reporter 322 reports, to the third person, that the charging is being performed. The reporter 322 gives the report by controlling the reporting device 92. When a delivery person unlocks the trunk 12 during the external charging, the reporting device 92 reports, to the delivery person, that the charging is being performed. Thus, it is possible to increase safety when the vehicle 1 is used as the delivery box during the external charging.

When a third person unlocks the trunk 12, the notifier 323 notifies the user that the third person unlocks the trunk 12. For example, the notification is given to the mobile terminal 3 carried by the user (FIG. 5). When a delivery person unlocks the trunk 12, a signal indicating that the delivery person unlocks the trunk 12 is transmitted from the notifier 323 to the mobile terminal 3. Through the notification, the user waiting for delivery can be informed that the delivery is completed.

In this embodiment, the delivery person is permitted to lock and unlock the trunk 12. The permission is not limited to this case. The delivery person may only be permitted to unlock the trunk 12, and the trunk 12 may be locked automatically. For example, when the delivery person unlocks the trunk 12, opens the trunk 12 to put a delivery in the luggage space R2, and then closes the trunk 12, the B-lock controller 302 may lock the trunk 12.

Although the verifier 304 according to this embodiment performs authentication using the signal from the electronic key 2 or the mobile terminal 3A, the authentication method may be any method without being limited to the method described above. For example, readers may be provided at predetermined parts of the vehicle body (for example, on the handles of the doors 11 and the trunk 12, or near side mirrors) so that authentication information can be input on the outside of the vehicle 1. In this case, authentication information input to any reader is sent to the verifier 304. The reader may read authentication information stored in a magnetic card or an integrated-circuit (IC) card. The reader may read a code displayed on the mobile terminal 3 (for example, a bar code or a two-dimensional code). The reader may read biological information (for example, a fingerprint) as the authentication information. The door 11 may be unlocked when authentication information is input to the reader provided on the handle of the door 11 and the verifier 304 authenticates the user successfully. The trunk 12 may be unlocked when authentication information is input to the reader provided on the handle of the trunk 12 and the verifier 304 authenticates the user successfully.

Figure 11:
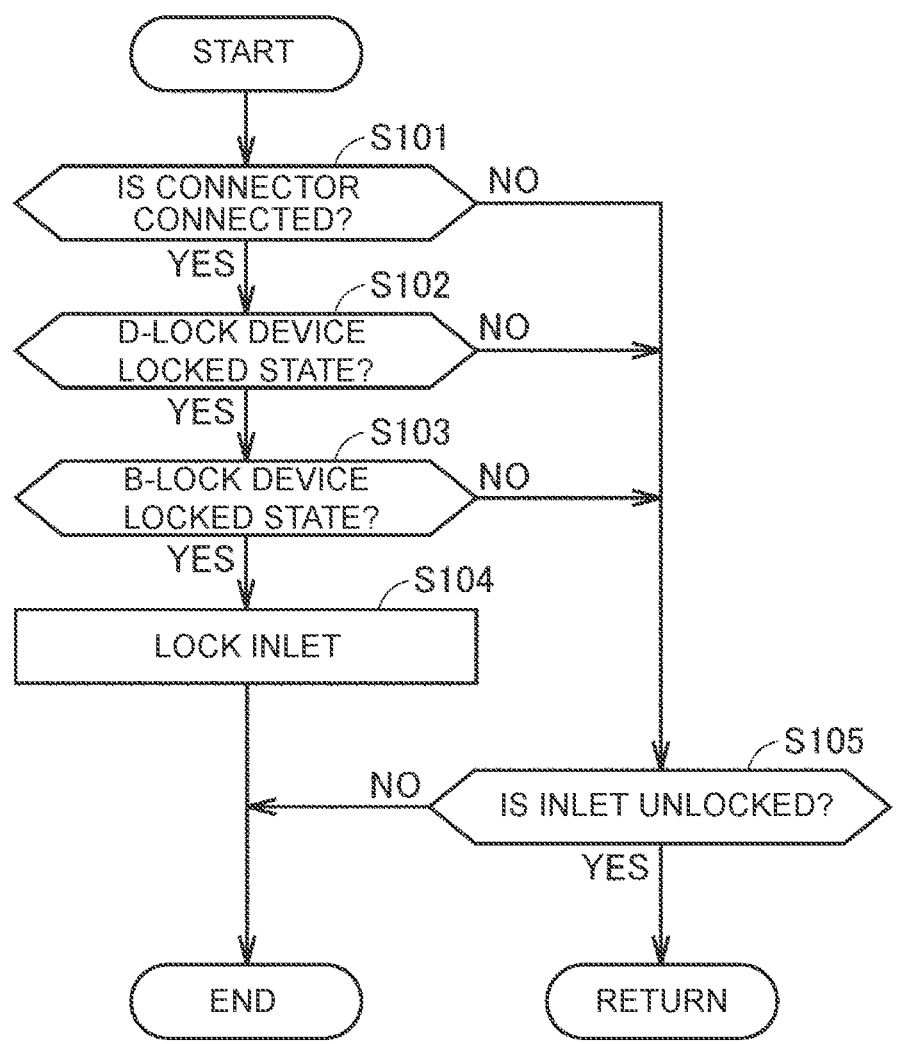
FIG. 11 is a flowchart illustrating control to be executed by the vehicle control device according to the embodiment of the present disclosure when the inlet is in an unlocked state.

The C-lock controller 301 controls switching between the locked state and the unlocked state of the inlet 20. In this embodiment, when all the doors 11 and the trunk 12 are locked while the inlet 20 is in the unlocked state, the C-lock controller 301 switches the inlet 20 to the locked state. FIG. 11 is a flowchart illustrating control to be executed by the C-lock controller 301 when the inlet 20 is in the unlocked state. The process illustrated in this flowchart is started when the inlet 20 is switched from the locked state to the unlocked state.

Referring to FIG. 11 together with FIG. 5 and FIG. 10, the C-lock controller 301 determines in Step (hereinafter referred to simply as "S") 101 whether a connector of an outlet cable (for example, the connector 210 illustrated in FIG. 5) is connected to the inlet 20. For example, the C-lock controller 301 can determine whether the connector is connected to the inlet 20 based on an output from the connection sensor S4.

When the connector is connected to the inlet 20 (YES in S101), the C-lock controller 301 determines in S102 whether all the doors 11 are in the locked state. For example, the C-lock controller 301 can determine whether the doors 11 are in the locked state based on the conditions of the D-lock devices 61 of the doors 11 (actuated or unactuated).

When all the doors 11 are in the locked state (YES in S102), the C-lock controller 301 determines in S103 whether the trunk 12 is in the locked state. For example, the C-lock controller 301 can determine whether the trunk 12 is in the locked state based on the condition of the B-lock device 62 (actuated or unactuated).

When the trunk 12 is in the locked state, the determination result is YES in S103. When all the determination results are YES in S101 to S103, the C-lock controller 301 switches the inlet 20 to the locked state (see FIG. 9) in S104 by causing the actuator A4 to drive the lock pin L4. When the process of S104 is executed, the series of processes illustrated in FIG. 11 is terminated.

When any one of the determination results is NO in S101 to S103, the C-lock controller 301 determines in S105 whether the inlet 20 is in the unlocked state. The determination result is NO in S105 when the inlet 20 is locked through a user's operation (for example, an operation for the connector-lock switch 22 illustrated in FIG. 2). When the determination result is NO in S105, the series of processes illustrated in FIG. 11 is terminated. When the inlet 20 is kept in the unlocked state (YES in S105), the process returns to the first step (S101).

When the inlet 20 is in the unlocked state, the C-lock controller 301 executes the control described above. Control to be executed by the C-lock controller 301 when the inlet 20 is in the locked state is described later (see FIG. 15 to FIG. 18).

Referring back to FIG. 10 together with FIG. 5, the charging controller 305 controls the charger 30 to externally charge the battery 100. In this embodiment, the storage device 330 stores a timer charging flag FD (hereinafter also referred to simply as "FD") indicating whether timer charging is scheduled. The user sets a charging schedule (for example, a charging start time and a charging end time) in the ECU 300 through the input device 91 to schedule timer charging based on the set charging schedule. The set charging schedule is stored in the storage device 330. When the timer charging is scheduled, FD is turned ON. The user can cancel the scheduled timer charging through the input device 91. When the scheduled timer charging is canceled, FD is turned OFF. When FD is ON, the charging controller 305 performs external charging based on the set charging schedule (that is, timer charging). That is, when the start time of the scheduled timer charging has arrived, the charging controller 305 starts to externally charge the battery 100. When a remote charging flag FE described below is ON, remote charging has priority over the timer charging.

The charging controller 305 can perform remote charging (that is, charging through a remote operation on the outside of the vehicle 1). In this embodiment, the storage device 330 stores the remote charging flag FE (hereinafter also referred to simply as "FE") indicating whether the remote charging is permitted. When FE is ON, the charging controller 305 is permitted to perform external charging through remote charging control. The remote charging control means that the charging controller 305 controls the charger 30 in response to a predetermined charging command received through the communication device 80 from the outside of the vehicle 1. When FE is OFF, the remote charging control of the charging controller 305 is forbidden. The user can set the value of FE (ON or OFF) through the input device 91.

In this embodiment, the ECU 300 receives a DR signal from the server 520 illustrated in FIG. 5. The user of the vehicle 1 electrically connects the vehicle 1 and the EVSE 400 so that the battery 100 is externally charged with electric power from the power system PG illustrated in FIG. 5, and keeps the vehicle 1 in a remotely chargeable state during a time frame indicated by the DR signal. Since the user prepares for the external charging in response to the DR signal, the user has a right to receive an incentive from the aggregator. The incentive to be received by the user may vary depending on the contribution amount. In at least a part of the time frame indicated by the DR signal, the battery 100 is externally charged in response to a charging command from the server 520 (that is, the remote charging control is performed by the charging controller 305).

Figure 12:
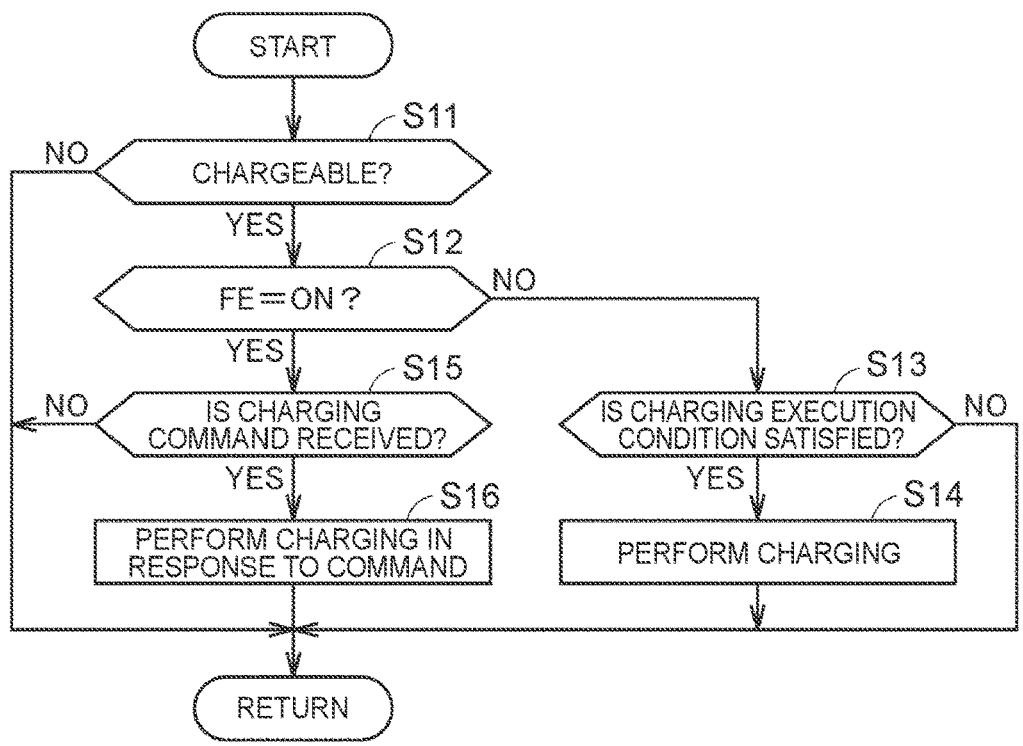
FIG. 12 is a flowchart illustrating external charging control to be executed by the vehicle control device according to the embodiment of the present disclosure.

FIG. 12 is a flowchart illustrating the external charging control to be executed by the charging controller 305. The process illustrated in this flowchart is repeatedly executed at every elapse of a predetermined time.

Referring to FIG. 12 together with FIG. 5 and FIG. 10, the charging controller 305 determines in S11 whether the vehicle 1 is externally chargeable. For example, the determination result is YES (chargeable) in S11 when the EVSE 400 and the vehicle 1 illustrated in FIG. 5 are electrically connected via the outlet cable 200 in a normal state and the inlet 20 to which the connector 210 of the outlet cable 200 is connected is in the locked state. When an abnormality (for example, a communication abnormality or a circuit abnormality) occurs in at least one of the vehicle 1 and the EVSE 400, the determination result is NO (unchargeable) in S11. The charging controller 305 checks a status of connection of the outlet cable 200 to each of the vehicle 1 and the EVSE 400. When the connection is insufficient, the determination result is NO (unchargeable) in S11. When the determination result is NO in S11, the process does not proceed to a next step (S12).

When the determination result is YES in S11, the charging controller 305 determines in S12 whether FE is ON. When FE is OFF (NO in S12), the charging controller 305 determines in S13 whether a predetermined charging execution condition is satisfied. For example, when FD is ON (that is, timer charging is scheduled), the charging execution condition is satisfied (YES in S13) within a timer charging period from a start time to an end time in a charging schedule. The charging execution condition is not satisfied (NO in S13) in a period outside the timer charging period. The charging execution condition is not satisfied also when the SOC of the battery 100 is higher than a predetermined value in the timer charging period. When FD is OFF and when the SOC of the battery 100 is equal to or lower than the predetermined value, the charging execution condition is satisfied (YES in S13).

When the determination result is YES in S13, the charging controller 305 controls the charger 30 illustrated in FIG. 1 to externally charge the battery 100 in S14. When the process of S14 is executed, the process returns to the first step (S11). While the determination results are YES in S11, NO in S12, and YES in S13, the battery 100 is externally charged continuously in S14. When the determination result is NO in S13, the process returns to the first step (S11) without performing the external charging by the charging controller 305 (S14).

When FE is ON (YES in S12), the charging controller 305 determines in S15 whether a charging command is received from the server 520. When the determination result is NO in S15, the process returns to the first step (S11). In a period in which the vehicle 1 is externally chargeable, FE is ON, and the charging command is not received (YES in S11, YES in S12, and NO in S15), the charging controller 305 waits for the charging command from the server 520 in S15. In a period in which the vehicle 1 is externally chargeable, FE is ON, and the charging command is received (YES in S11, S12, and S15), the charging controller 305 performs external charging in response to the charging command from the server 520 (that is, remote charging) in S16.

Referring back to FIG. 10, in this embodiment, the storage device 330 stores a control mode flag FA (hereinafter also referred to simply as "FA"), a delivery flag FB (hereinafter also referred to simply as "FB"), and a B-C conjunction flag FC (hereinafter also referred to simply as "FC").

FA is a flag indicating a control mode. The selector 321 selects a control mode from among options depending on the value of FA. In this embodiment, the options include first to fourth control modes. The selector 321 selects the first control mode, the second control mode, the third control mode, and the fourth control mode when FA is 1, 2, 3, and 4, respectively. The value of FA is set by the FA setting unit 311.

FB is a flag indicating whether the luggage space R2 illustrated in FIG. 1 and FIG. 3 is used as the delivery box. When FB is ON, the luggage space R2 may be used as the delivery box. When FB is OFF, there is a strong possibility that the luggage space R2 is not used as the delivery box. The value of FB is set by the FB setting unit 312.

FC is a flag indicating whether unlocking of the trunk 12 and unlocking of the inlet 20 are made in conjunction with each other. Although details are described later, the selector 321 can select the first control mode only when FC is ON (see FIG. 13). When the selector 321 selects the first control mode, the inlet 20 is unlocked in conjunction with the unlocking of the trunk 12 by the user. When FC is OFF, the unlocking of the trunk 12 and the unlocking of the inlet 20 are not made in conjunction with each other. The user can set the value of FC (ON or OFF) through the input device 91.

Figure 13:
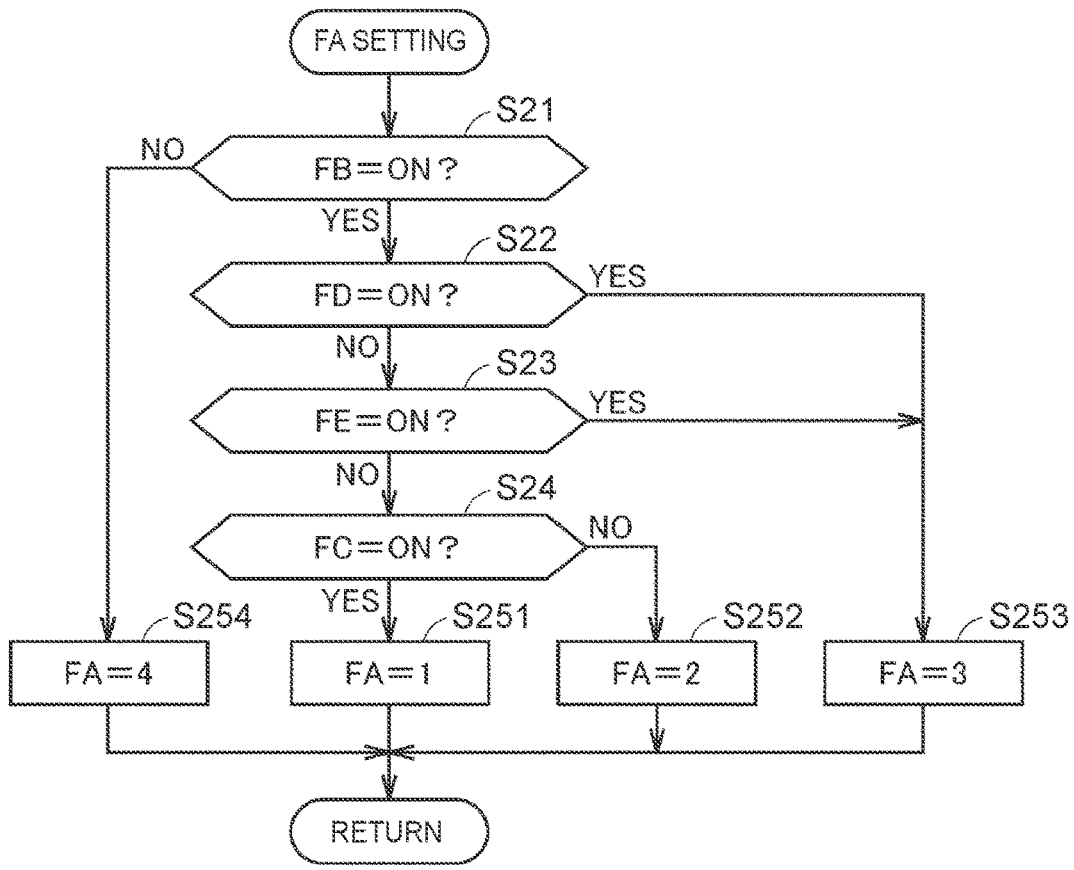
FIG. 13 is a flowchart illustrating a process of setting FA illustrated in FIG. 10.

FIG. 13 is a flowchart illustrating a process of setting FA by the FA setting unit 311. The process illustrated in this flowchart is repeatedly executed at every elapse of a predetermined time.

Referring to FIG. 13 together with FIG. 10, the FA setting unit 311 determines in S21 whether FB is ON. When the determination result is NO (FB=OFF) in S21, the FA setting unit 311 sets FA to "4" in S254. The method for setting FB by the FB setting unit 312 is described later (see FIG. 14).

When the determination result is YES (FB=ON) in S21, the FA setting unit 311 determines in S22 whether FD is ON. When the determination result is NO (FD=OFF) in S22, the FA setting unit 311 determines in S23 whether FE is ON. When FD or FE is ON (YES in S22 or S23), the FA setting unit 311 sets FA to "3" in S253.

When both FD and FE are OFF (NO in both S22 and S23), the FA setting unit 311 determines in S24 whether FC is ON. When the determination result is YES (FC=ON) in S24, the FA setting unit 311 sets FA to "1" in S251. When the determination result is NO (FC=OFF) in S24, the FA setting unit 311 sets FA to "2" in S252.

Figure 14:
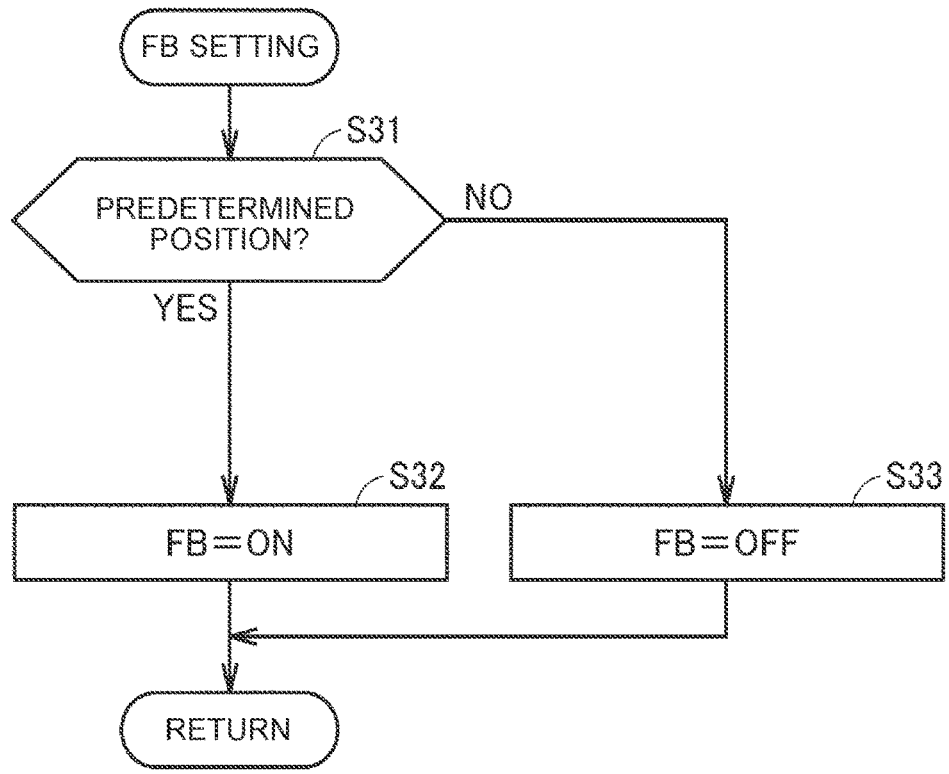
FIG. 14 is a flowchart illustrating a process of setting FB illustrated in FIG. 10.

FIG. 14 is a flowchart illustrating a process of setting FB by the FB setting unit 312. The process illustrated in this flowchart is repeatedly executed at every elapse of a predetermined time.

Referring to FIG. 14 together with FIG. 10, the FB setting unit 312 determines in S31 whether the vehicle 1 is present at a predetermined position. For example, the FB setting unit 312 can acquire positional information of the vehicle 1 from the NAVI 93. The predetermined position is set to a position where the vehicle 1 can be used as the delivery box. In this embodiment, the predetermined position is a user's house. The predetermined position is not limited to the user's house, but may include both the user's house and workplace.

When the vehicle 1 is present at the predetermined position (YES in S31), the FB setting unit 312 sets FB to "ON" in S32. When the vehicle 1 is not present at the predetermined position (NO in S31), the FB setting unit 312 sets FB to "OFF" in S33. For example, when the vehicle 1 is being externally charged using public power supply equipment, there is a strong possibility that the luggage space R2 is not used as the delivery box. In this embodiment, when the vehicle 1 is being externally charged using public power supply equipment, the determination result is NO in S31, and FB is set to "OFF".

Figure 15:
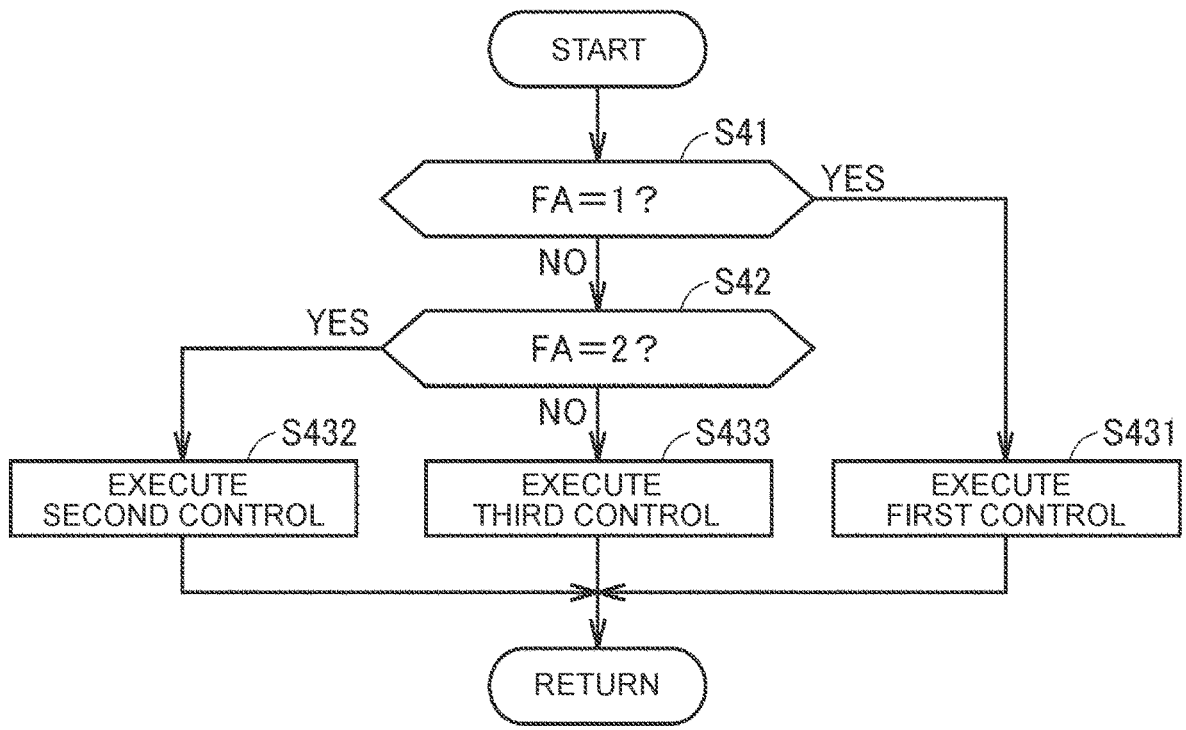
FIG. 15 is a flowchart illustrating control to be executed by the vehicle control device according to the embodiment of the present disclosure when the inlet is in a locked state.

FIG. 15 is a flowchart illustrating control to be executed by the C-lock controller 301, the reporter 322, and the notifier 323 when the inlet 20 is in the locked state. The process illustrated in this flowchart is repeatedly executed when the inlet 20 is in the locked state.

Figure 16:
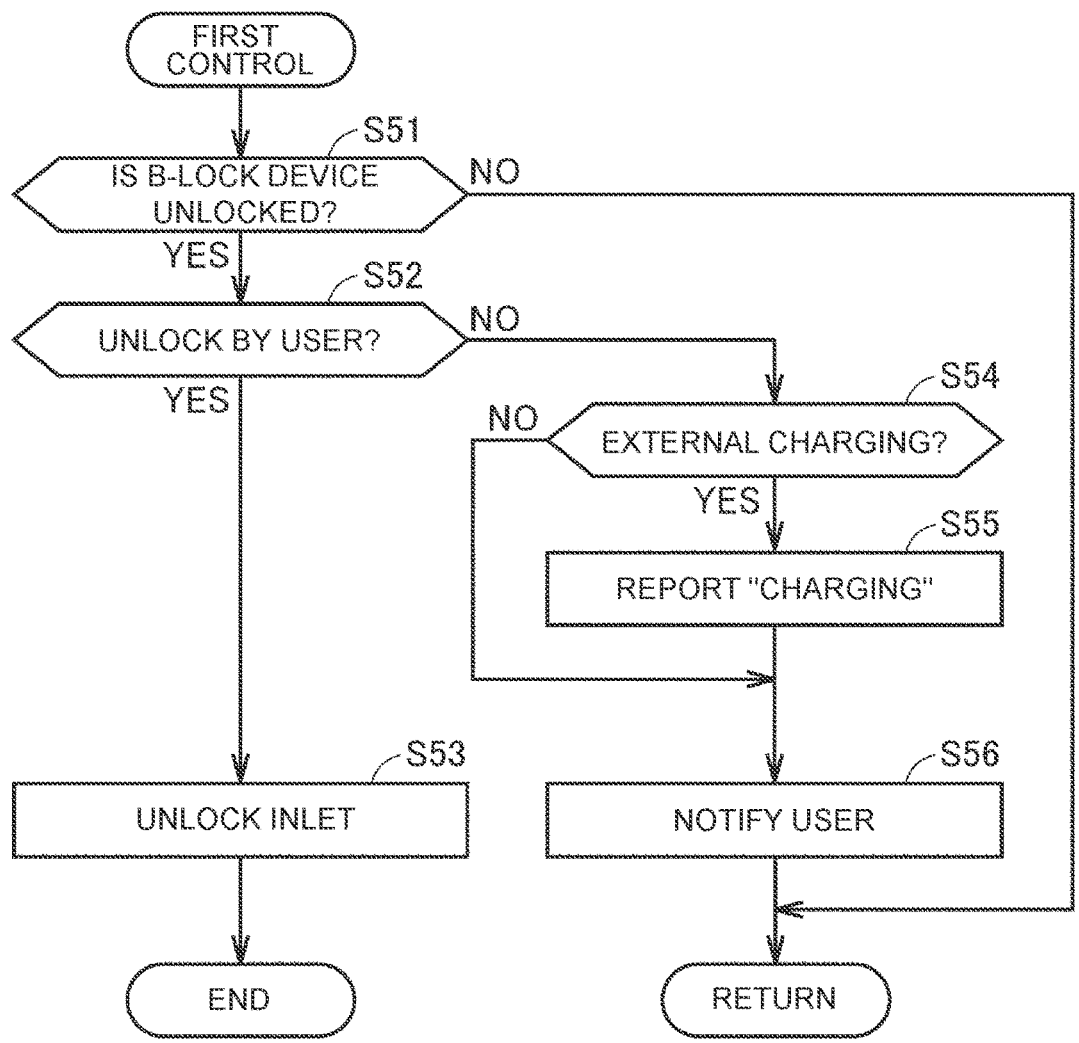
FIG. 16 is a flowchart illustrating details of first control illustrated in FIG. 15.

Referring to FIG. 15 together with FIG. 10, the C-lock controller 301 determines in S41 whether FA is 1. When the determination result is YES (FA=1) in S41, the C-lock controller 301 executes first control described below in S431. FIG. 16 is a flowchart illustrating details of the first control. The fact that FA is 1 means that the selector 321 selects the first control mode.

Referring to FIG. 16 together with FIG. 10, the C-lock controller 301 determines in S51 whether the trunk 12 is switched from the locked state to the unlocked state. When the trunk 12 is not unlocked (NO in S51), the process returns to the main routine (that is, the process illustrated in FIG. 15).

When the trunk 12 is unlocked (YES in S51), the C-lock controller 301 determines in S52 whether the trunk 12 is unlocked by the user. For example, the C-lock controller 301 can determine whether the trunk 12 is unlocked by the user or a third person based on an authentication result from the verifier 304. When the trunk 12 is unlocked by the user (YES in S52), the C-lock controller 301 controls the actuator A4 to switch the inlet 20 to the unlocked state in S53. When the process of S53 is executed, the series of processes illustrated in FIG. 15 and FIG. 16 is terminated.

When the trunk 12 is unlocked by a person other than the user (NO in S52), the inlet 20 is kept in the locked state, and the process proceeds to S54. The fact that the determination result is NO in S52 means that the trunk 12 is unlocked by a predetermined third person (for example, a delivery person of a delivery service).

In S54, the reporter 322 determines whether external charging is being performed. When the determination result is YES in S54 (external charging is being performed), the reporter 322 controls the reporting device 92 to report in S55 that the charging is being performed. This report is given to the third person who unlocks the trunk 12. For example, the reporting device 92 may output a voice message "The car is being charged." as the report.

When the report is given, the process proceeds to S56. When the determination result is NO in S54 (external charging is not being performed), the process proceeds to S56 without giving the report. In S56, the notifier 323 transmits a predetermined signal (specifically, a signal indicating that the trunk 12 is unlocked by the third person) to the mobile terminal 3 (FIG. 5). When the process of S56 is executed, the process returns to the main routine (that is, the process illustrated in FIG. 15).

Figure 17:
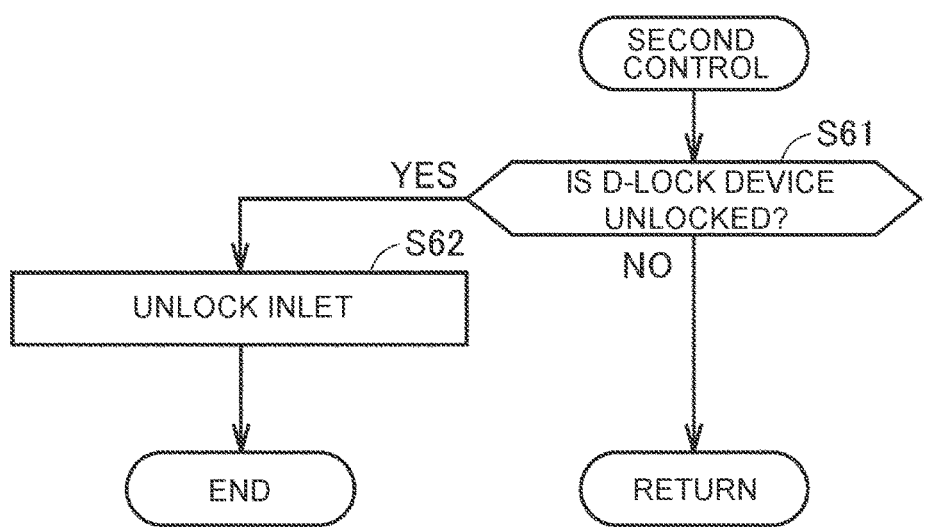
FIG. 17 is a flowchart illustrating details of second control illustrated in FIG. 15.

Referring back to FIG. 15 together with FIG. 10, when the determination result is NO in S41, the C-lock controller 301 determines in S42 whether FA is 2. When the determination result is YES (FA=2) in S42, the C-lock controller 301 executes second control described below in S432. FIG. 17 is a flowchart illustrating details of the second control. The fact that FA is 2 means that the selector 321 selects the second control mode.

Referring to FIG. 17 together with FIG. 10, the C-lock controller 301 determines in S61 whether at least one door 11 is switched from the locked state to the unlocked state. When the door 11 is not unlocked (NO in S61), the process returns to the main routine (that is, the process illustrated in FIG. 15). When the door 11 is unlocked (YES in S61), the C-lock controller 301 controls the actuator A4 to switch the inlet 20 to the unlocked state in S62. When the process of S62 is executed, the series of processes illustrated in FIG. 15 and FIG. 17 is terminated.

Figure 18:
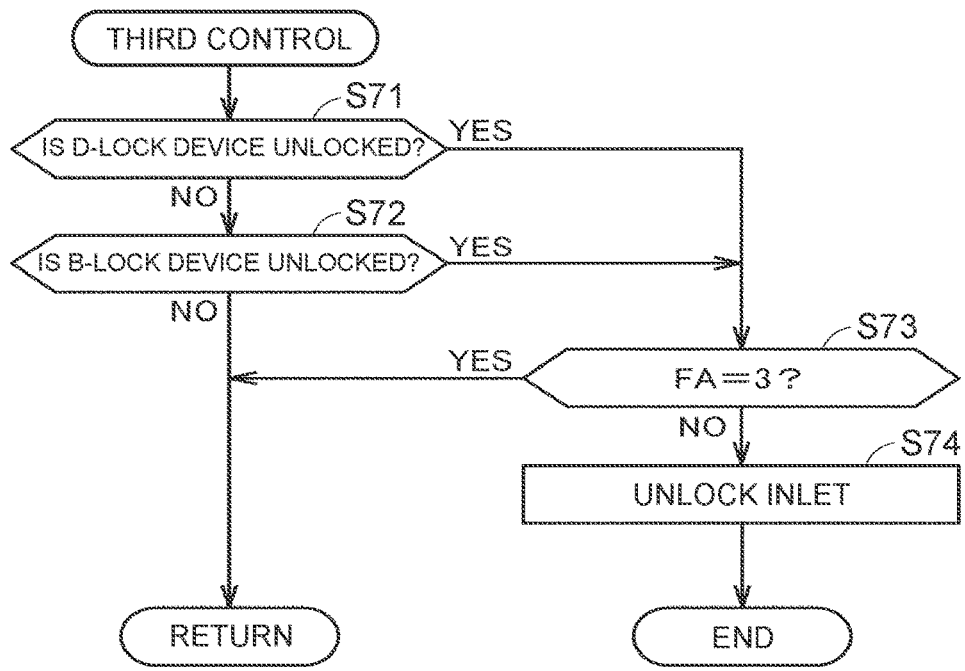
FIG. 18 is a flowchart illustrating details of third control illustrated in FIG. 15.

Referring back to FIG. 15 together with FIG. 10, when the determination result is NO in S42, the C-lock controller 301 executes third control described below in S433. The fact that the determination result is NO in S42 means that FA is 3 or 4. FIG. 18 is a flowchart illustrating details of the third control.

Referring to FIG. 18 together with FIG. 10, the C-lock controller 301 determines in S71 whether at least one door 11 is switched from the locked state to the unlocked state. In S72, the C-lock controller 301 determines whether the trunk 12 is switched from the locked state to the unlocked state. When the determination results are NO in both S71 and S72, the process returns to the main routine (that is, the process illustrated in FIG. 15). When the determination result is YES in S71 or S72, the process proceeds to S73.

In S73, the C-lock controller 301 determines whether FA is 3. When the determination result is NO in S73, the C-lock controller 301 controls the actuator A4 to switch the inlet 20 to the unlocked state in S74. When the process of S74 is executed, the series of processes illustrated in FIG. 15 and FIG. 18 is terminated. The fact that the determination result is NO in S73 means that FA is 4. The fact that FA is 4 means that the selector 321 selects the fourth control mode.

When the determination result is YES (FA=3) in S73, the inlet 20 is kept in the locked state, and the process returns to the main routine (that is, the process illustrated in FIG. 15). The fact that FA is 3 means that the selector 321 selects the third control mode.

As described above, when the selector 321 selects the fourth control mode (NO in S73) and when the door 11 or the trunk 12 is unlocked while the inlet 20 is in the locked state (YES in S71 or S72), the ECU 300 switches the inlet 20 to the unlocked state (S74). In this embodiment, when the vehicle 1 is not present at the position where the vehicle 1 can be used as the delivery box (for example, the user's house), FB is set to "OFF" through the process in FIG. 14. When FB is OFF, FA is set to "4" through the process in FIG. 13. Therefore, when the vehicle 1 is not used as the delivery box, the user can unlock the inlet 20 by unlocking the door 11 or the trunk 12.

When the selector 321 selects the third control mode (YES in S73) and when the door 11 or the trunk 12 is unlocked while the inlet 20 is in the locked state (YES in S71 or S72), the ECU 300 does not switch the inlet 20 to the unlocked state. In this embodiment, when FD or FE is ON, FA is set to "3" through the process in FIG. 13. That is, the ECU 300 selects the third control mode when the timer charging or the remote charging is being performed or when the timer charging or the remote charging is scheduled. Thus, the inlet 20 is kept in the locked state, and the timer charging or the remote charging is easily performed as scheduled.

As described above, when the trunk 12 is unlocked while the inlet 20 is in the locked state (YES in S51), the ECU 300 according to this embodiment determines whether the trunk 12 is unlocked by the user or a third person (S52). When the trunk 12 is unlocked by the user (YES in S52), the ECU 300 switches the inlet 20 to the unlocked state (S53). When the trunk 12 is unlocked by the third person (NO in S52), the ECU 300 can execute the control to restrain switching the inlet 20 to the unlocked state (for example, the first control illustrated in FIG. 16). According to the first control, it is possible to reduce the occurrence of a case where the inlet 20 is unlocked while the user is absent. Further, the user can switch the inlet 20 to the unlocked state by unlocking the trunk 12.

When the door 11 is unlocked while the inlet 20 is in the locked state (YES in S61), the ECU 300 according to this embodiment switches the inlet 20 to the unlocked state (S62). When the trunk 12 is unlocked while the inlet 20 is in the locked state (NO in S61), the ECU 300 can execute the control to restrain switching the inlet 20 to the unlocked state (for example, the second control illustrated in FIG. 17).

According to the second control, it is possible to reduce the occurrence of the case where the inlet 20 is unlocked while the user is absent. Further, the user can switch the inlet 20 to the unlocked state by unlocking the door 11.

The ECU 300 according to the embodiment can execute the first control to the third control (FIG. 16 to FIG. 18) depending on the control mode. However, it is not essential that the control mode can be changed. For example, the ECU 300 may execute only the first control. Further, the ECU 300 may execute only the second control.

Figure 19:
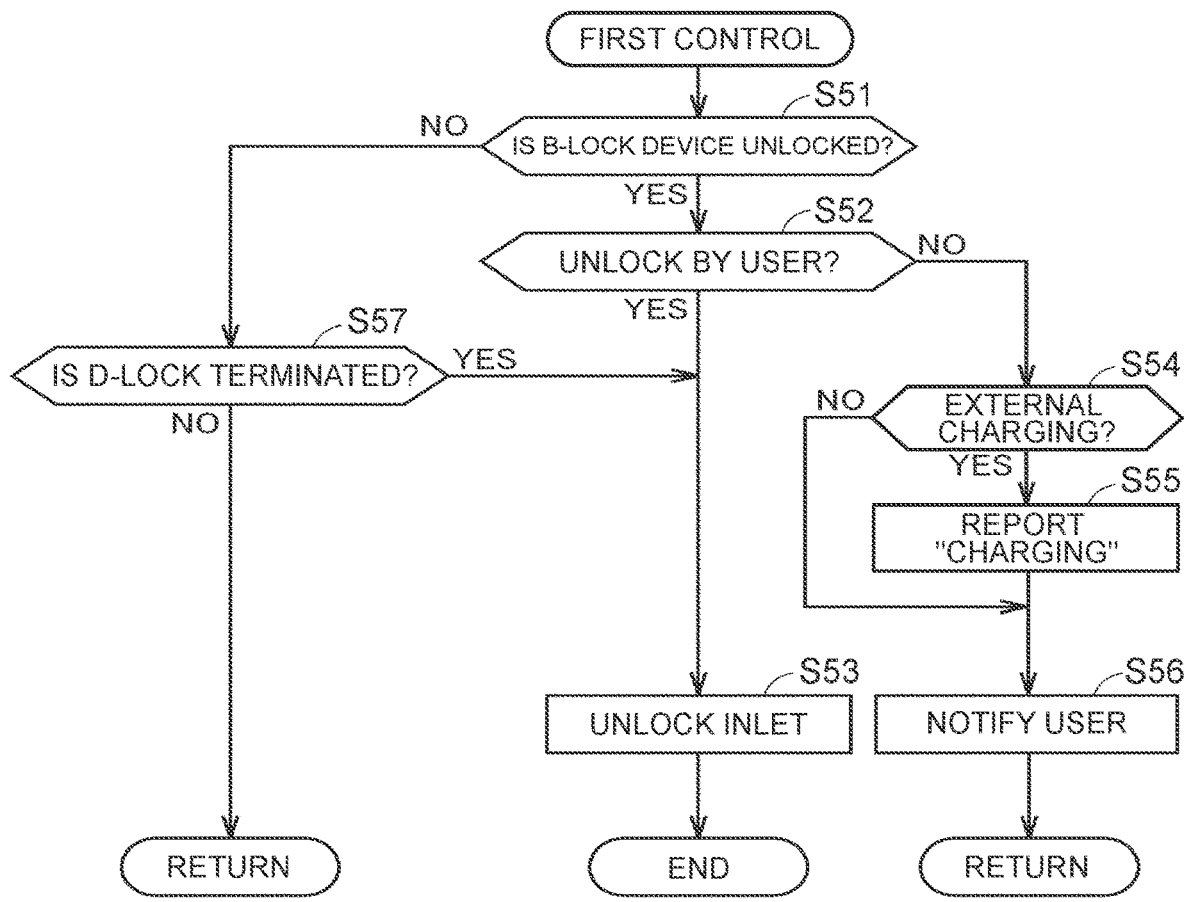
FIG. 19 is a flowchart illustrating a modified example of the process illustrated in FIG. 16.

The ECU 300 may execute a process illustrated in FIG. 19 as the first control (S431 in FIG. 15) in place of the process illustrated in FIG. 16. FIG. 19 is a flowchart illustrating a modified example of the process illustrated in FIG. 16. The process illustrated in FIG. 19 is the same as the process illustrated in FIG. 16 except that S57 is added.

Referring to FIG. 19 together with FIG. 10, when the determination result is NO in S51, the process proceeds to S57. In S57, the C-lock controller 301 determines whether at least one door 11 is switched from the locked state to the unlocked state. When the door 11 is not unlocked (NO in S57), the process returns to the main routine (that is, the process illustrated in FIG. 15). When the door 11 is unlocked (YES in S57), the C-lock controller 301 controls the actuator A4 to switch the inlet 20 to the unlocked state in S53. When the process of S53 is executed, the series of processes illustrated in FIG. 15 and FIG. 19 is terminated. According to the first control, the user can switch the inlet 20 to the unlocked state by unlocking the door 11 or the trunk 12.

In the first control illustrated in FIG. 16 or FIGS. 19, S54 to S56 are not essential. For example, S54 and S55 may be omitted. Further, S56 may be omitted. All of S54 to S56 may be omitted.

Figure 20:
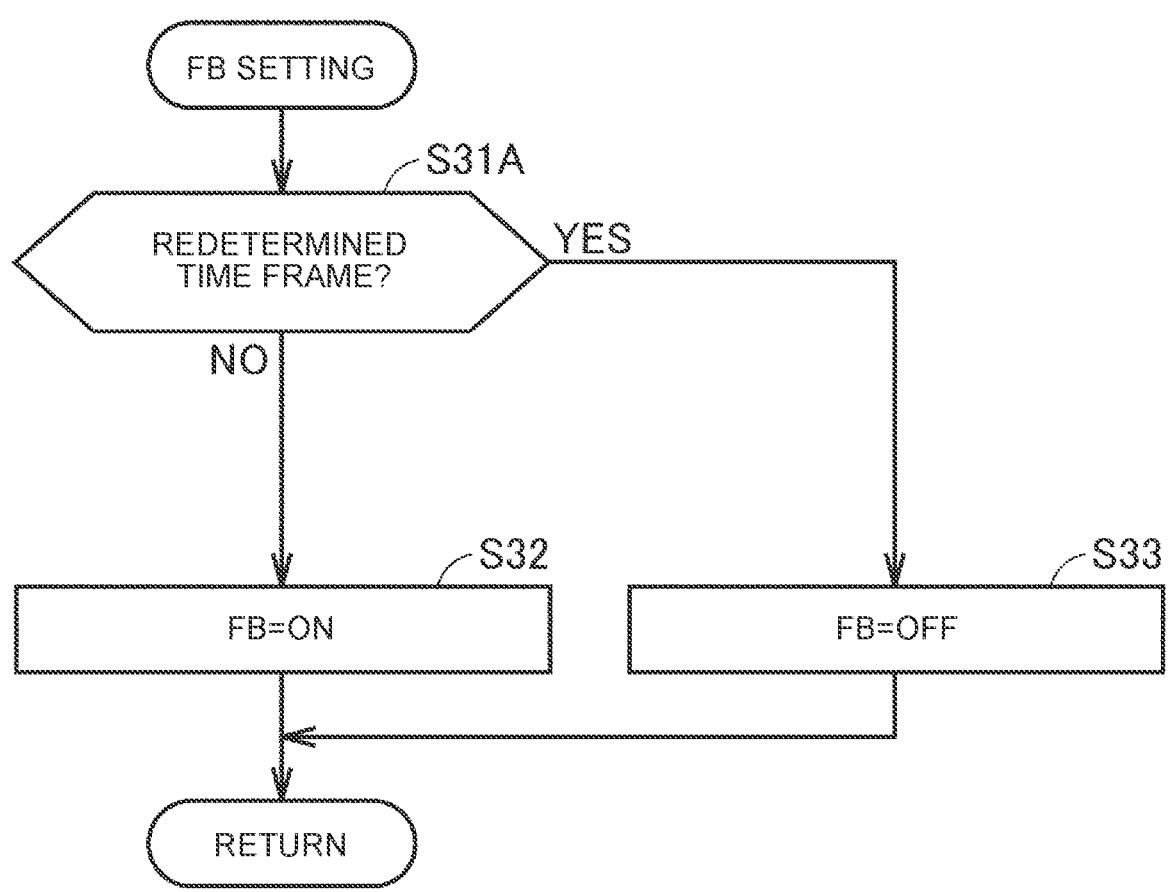
FIG. 20 is a flowchart illustrating a modified example of the process illustrated in FIG. 14.

The ECU 300 may set FB through a process illustrated in FIG. 20 in place of the process illustrated in FIG. 14. FIG. 20 is a flowchart illustrating a modified example of the process illustrated in FIG. 14. In the process illustrated in FIG. 20, S31A is employed in place of S31 in FIG. 14.

Referring to FIG. 20 together with FIG. 10, the FB setting unit 312 determines in S31A whether the current time falls within a predetermined time frame. The predetermined time frame is set to a time frame in which the user does not use the vehicle 1 as the delivery box. When the current time falls within the predetermined time frame (YES in S31A), the FB setting unit 312 sets FB to "OFF" in S33. When the current time falls out of the predetermined time frame (NO in S31A), the FB setting unit 312 sets FB to "ON" in S32.

In the modified example illustrated in FIG. 20, in the time frame in which the vehicle 1 is not used as the delivery box, FB is set to "OFF" through the process of S33. When FB is OFF, FA is set to "4" through the process in FIG. 13, and the selector 321 selects the fourth control mode. Therefore, when the vehicle 1 is not used as the delivery box, the user can unlock the inlet 20 by unlocking the door 11 or the trunk 12.

The vehicle to be controlled by the vehicle control device is not limited to the four-door vehicle illustrated in FIG. 2. For example, the number of occupant doors is not limited to four, but is arbitrary. Further, the number of seats is arbitrary. For example, in a vehicle having a seat structure of three or more rows, a space behind seats in a rearmost row may be used as the delivery box. An opening and closing member configured to open and close the space (that is, the delivery space) may be a hatch. The number of delivery spaces and the number of opening and closing members for the delivery spaces are not limited to one, but may be two or more.

The configuration of the vehicle illustrated in FIG. 1 may be changed as appropriate. For example, the current path where the charging relay 40 is provided may branch off from a current path between the SMR 50 and the traveling driver 51 instead of the current path between the SMR 50 and the battery 100. The door 11 and the trunk 12 may be locked and unlocked using a mechanical key. Each lock device may have a sensor configured to detect that the opening and closing member is unlocked or locked. The method for switching the locked state and the unlocked state of the inlet 20 may be any method without being limited to the method illustrated in FIG. 6 to FIG. 9. It is not essential that the vehicle is chargeable by remote charging. It is not even essential that the vehicle is chargeable by timer charging.

In the embodiment, the enclosed luggage space is employed as the delivery space. However, the delivery space is not limited to the enclosed luggage space, but may be an open luggage space connected to the occupant space. The open luggage space may be provided at the rear of the vehicle. A camera may be provided in the luggage space to operate when a third person opens an opening and closing member (for example, a hatch) for the luggage space.

In the embodiment, the vehicle control device (ECU 300) is mounted on the vehicle 1. However, the vehicle control device need not be mounted on the vehicle 1, but may be mounted on a mobile terminal such as a smartphone, an electronic key, or a wearable device.

It should be understood that the embodiment disclosed herein is illustrative but is not limitative in all respects. The scope of the present disclosure is defined by the claims rather than the description of the embodiment above, and is intended to encompass meanings of equivalents to the elements in the claims and all modifications within the scope of the claims.

What is claimed is:

1. A vehicle control device configured to control a vehicle having a shareable space accessible to a predetermined third party other than a user of the vehicle,
    the vehicle including:
        an occupant door;
        an opening and closing member configured to open and close the shareable space;
        an inlet connectable to a connector of an outlet cable; and
        a power storage device chargeable with electric power supplied to the inlet from an outside of the vehicle,
        the occupant door and the opening and closing member being lockable and unlockable by the user,
        the opening and closing member being unlockable by a mobile terminal operated by the third party,
        the inlet being switchable between a locked state in which detachment of the connector is restricted and an unlocked state in which the detachment of the connector is permitted,
    the vehicle control device comprising an electronic control unit configured to:
        control switching between the locked state and the unlocked state of the inlet;
        switch the inlet to the unlocked state when the opening and closing member is unlocked by the user while the inlet is in the locked state; and
        restrain switching the inlet to the unlocked state when the opening and closing member is unlocked by the third party while the inlet is in the locked state,
    wherein:
        the electronic control unit is configured to select a control mode from among options including a first control mode;
        the electronic control unit is configured to switch the inlet to the unlocked state when the first control mode is selected and when the opening and closing member is unlocked by the user while the inlet is in the locked state; and
        the electronic control unit is configured to restrain switching the inlet to the unlocked state when the first control mode is selected and when the opening and closing member is unlocked by the third party while the inlet is in the locked state.

2. The vehicle control device according to claim 1, wherein:
    the shareable space is an enclosed luggage space that is not connected to an occupant space; and
    the opening and closing member is a trunk or a hatch.

3. The vehicle control device according to claim 1, wherein the electronic control unit is configured to report, to the third party, that the power storage device is being charged, when the opening and closing member is unlocked by the third party while the power storage device is being charged with the electric power supplied to the inlet from the outside of the vehicle.

4. The vehicle control device according to claim 1, wherein the electronic control unit is configured to notify the user that the opening and closing member is unlocked by the third party, when the opening and closing member is unlocked by the third party.

5. The vehicle control device according to claim 1, wherein:
    the electronic control unit is configured to select a control mode from among the options further including a second control mode;
    the electronic control unit is configured to switch the inlet to the unlocked state when the second control mode is selected and when the occupant door is unlocked while the inlet is in the locked state; and
    the electronic control unit is configured to restrain switching the inlet to the unlocked state when the second control mode is selected and when the opening and closing member is unlocked while the inlet is in the locked state.

6. The vehicle control device according to claim 1, wherein:
    the electronic control unit is configured to select a control mode from among the options further including a third control mode; and
    the electronic control unit is configured to restrain switching the inlet to the unlocked state when the third control mode is selected and when the occupant door or the opening and closing member is unlocked while the inlet is in the locked state.

7. The vehicle control device according to claim 6, wherein the electronic control unit is configured to select the third control mode when charging based on a preset schedule or charging through a remote operation on the outside of the vehicle is being performed or when the charging based on the preset schedule or the charging through the remote operation on the outside of the vehicle is scheduled.

8. The vehicle control device according to claim 1, wherein:
    the electronic control unit is configured to select a control mode from among the options further including a fourth control mode; and the electronic control unit is configured to switch the inlet to the unlocked state when the fourth control mode is selected and when the occupant door or the opening and closing member is unlocked while the inlet is in the locked state.

9. The vehicle control device according to claim 8, wherein the electronic control unit is configured to select the fourth control mode when the vehicle is not present at a predetermined position.

10. The vehicle control device according to claim 8, wherein the electronic control unit is configured to select the fourth control mode in a predetermined time frame.

11. The vehicle control device according to claim 1, wherein the electronic control unit is configured to switch the inlet to the locked state when both the occupant door and the opening and closing member are in a locked state while the inlet is in the unlocked state.

12. A vehicle control device configured to control a vehicle having a shareable space accessible to a predetermined third party other than a user of the vehicle,
the vehicle including:
an occupant door;
an opening and closing member configured to open and close the shareable space;
an inlet connectable to a connector of an outlet cable; and
a power storage device chargeable with electric power supplied to the inlet from an outside of the vehicle,
the occupant door and the opening and closing member being lockable and unlockable by the user,
the opening and closing member being unlockable by a mobile terminal operated by the third party,
the inlet being switchable between a locked state in which detachment of the connector is restricted and an unlocked state in which the detachment of the connector is permitted,
the vehicle control device comprising an electronic control unit, the electronic control unit being configured to:
control switching between the locked state and the unlocked state of the inlet;
switch the inlet to the unlocked state when the occupant door is unlocked while the inlet is in the locked state; and
restrain switching the inlet to the unlocked state when the opening and closing member is unlocked while the inlet is in the locked state,
wherein:
the electronic control unit is configured to select a control mode from among options including a first control mode;
the electronic control unit is configured to switch the inlet to the unlocked state when the first control mode is selected and when the opening and closing member is unlocked by the user while the inlet is in the locked state; and
the electronic control unit is configured to restrain switching the inlet to the unlocked state when the first control mode is selected and when the opening and closing member is unlocked by the third party while the inlet is in the locked state.

* * * * *